US008498860B2

(12) United States Patent
Matsuoka

(10) Patent No.: US 8,498,860 B2
(45) Date of Patent: Jul. 30, 2013

(54) MODULATION DEVICE, MODULATION METHOD, DEMODULATION DEVICE, AND DEMODULATION METHOD

(75) Inventor: Hosei Matsuoka, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1464 days.

(21) Appl. No.: 12/066,836

(22) PCT Filed: Oct. 2, 2006

(86) PCT No.: PCT/JP2006/319669
§ 371 (c)(1),
(2), (4) Date: Mar. 14, 2008

(87) PCT Pub. No.: WO2007/043376
PCT Pub. Date: Apr. 19, 2007

(65) Prior Publication Data
US 2008/0243491 A1    Oct. 2, 2008

(30) Foreign Application Priority Data

Oct. 7, 2005    (JP) .................................. 2005-295526

(51) Int. Cl.
*G10L 19/00* (2006.01)
(52) U.S. Cl.
USPC ......... 704/200.1; 704/205; 704/220; 704/258
(58) Field of Classification Search
None
See application file for complete search history.

(56) References Cited

U.S. PATENT DOCUMENTS

| 4,112,368 | A * | 9/1978 | Ewanus et al. | ................. 375/130 |
| 6,112,180 | A | 8/2000 | Mitsuhashi et al. | |
| 6,529,562 | B1 * | 3/2003 | Muraishi | ....................... 375/300 |
| 6,628,735 | B1 * | 9/2003 | Belotserkovsky et al. | ... 375/355 |
| 7,505,823 | B1 | 3/2009 | Bartlett et al. | |
| 7,839,939 | B2 * | 11/2010 | Lee et al. | ...................... 375/259 |
| 2003/0185411 | A1 | 10/2003 | Atlas et al. | |
| 2006/0055466 | A1 * | 3/2006 | Hirano et al. | ................... 331/16 |

FOREIGN PATENT DOCUMENTS

| EP | 1 205 045 A1 | 5/2002 |
| JP | 62-286359 | 12/1987 |
| JP | 63 84216 | 4/1988 |
| JP | 63 22102 | 5/1988 |
| JP | 9 224005 | 8/1997 |
| JP | 10 290215 | 10/1998 |
| JP | 11-110913 | 4/1999 |
| JP | 2000-196861 | 7/2000 |
| JP | 2001 28577 | 1/2001 |
| JP | 2001 148670 | 5/2001 |

(Continued)

OTHER PUBLICATIONS

Extended European Search Report Issued Dec. 30, 2010, in European Patent Application No. 06811017.0.
Xiaoxiao Dong, et al., "Data Hiding Via Phase Manipulation of Audio Signals", Acoustics, Speech, and Signal Processing, 2004. Proceedings. (ICASSP'2004). IEEE International Conference on Montreal, Quebec, Canada, vol. 5, XP-010718944, May 17, 2004, pp. V-377 to V-380.
W. C. Wong, et al., "Transmitting Data on the Phase of Speech Signals", International Conference on Communications, vol. 19, XP-000797376, Jun. 19, 1983, pp. 1629-1633.
Shuozhong Wang, et al., "Data Hiding in Digital Audio by Frequency Domain Dithering", Second International Workshop on Mathematical Methods, Models, and Architectures for Computer Network Security, MMM-ACNS 2003, vol. 2776/2003, XP-002614526, Sep. 21, 2003, pp. 383-394.
Communication pursuant to Article 94(3) EPC issued Apr. 23, 2012, in Application No. 06 811 017.0-1224.

*Primary Examiner* — Leonard Saint Cyr
(74) *Attorney, Agent, or Firm* — Oblon, Spivak, McClelland, Maier & Neustadt, L.L.P.

(57) ABSTRACT

A modulation device including: a modulation unit for modulating a carrier in an audible sound range by an encoded transmission signal to generate a modulated signal; a masker sound generation unit for generating a masker signal outputted as a masker sound for making the modulated signal harder to hear when transmitted with the modulated signal; and an acoustic signal generation unit for inserting the masker signal in the modulated signal to generate an acoustic signal.

5 Claims, 17 Drawing Sheets

FOREIGN PATENT DOCUMENTS

| | | |
|---|---|---|
| JP | 2002 9734 | 1/2002 |
| JP | 2002-290361 | 10/2002 |
| JP | 2002 354059 | 12/2002 |
| JP | 2003 506918 | 2/2003 |
| JP | 3491560 | 11/2003 |
| JP | 2004 88662 | 3/2004 |
| JP | 2004-207983 | 7/2004 |
| JP | 2005-51462 | 2/2005 |
| JP | 2006 5390 | 1/2006 |
| JP | 2006 121222 | 5/2006 |
| WO | WO 01/10065 A1 | 2/2001 |
| WO | 02 45286 | 6/2002 |

\* cited by examiner

Fig.9
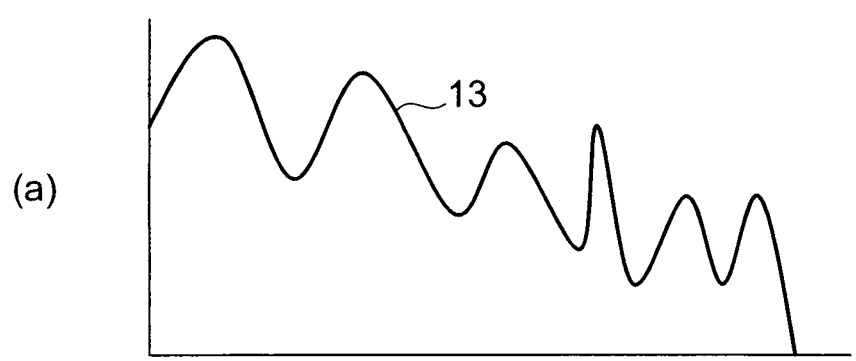
(a)
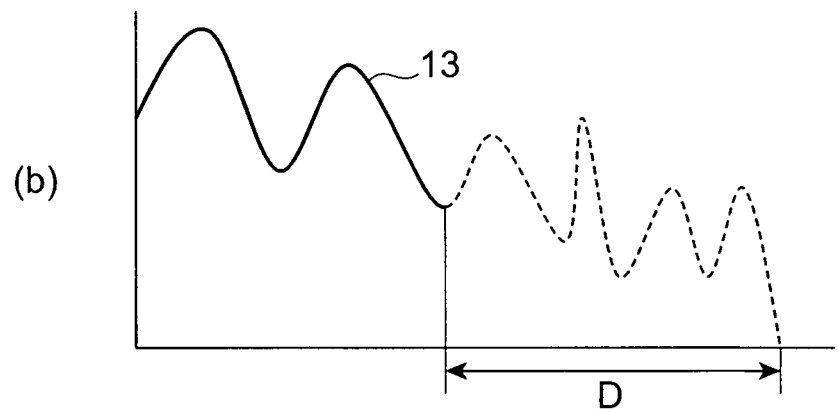
(b)
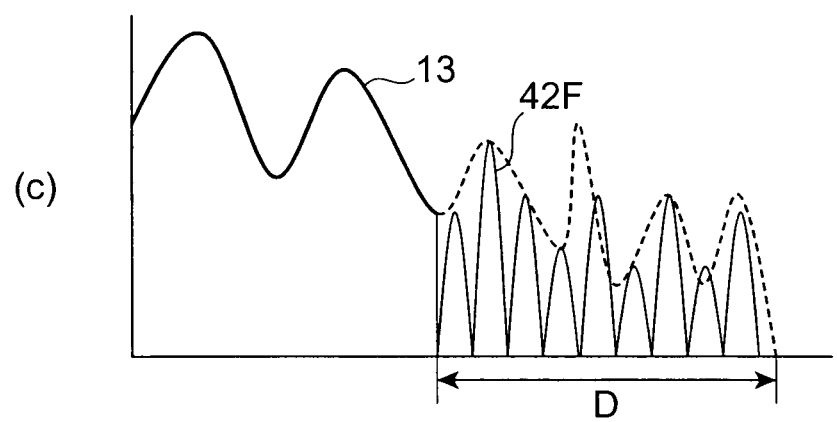
(c)

Fig.17
(a)
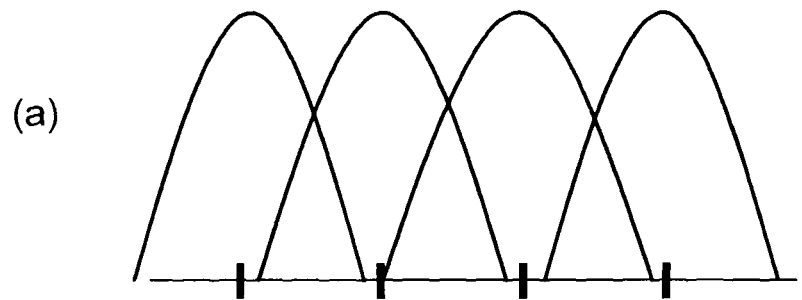
(b)
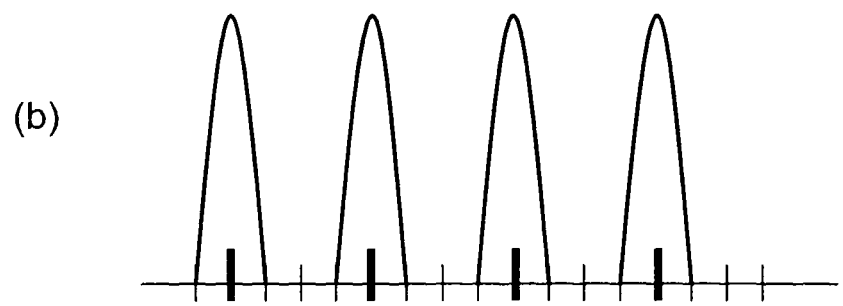
(c)
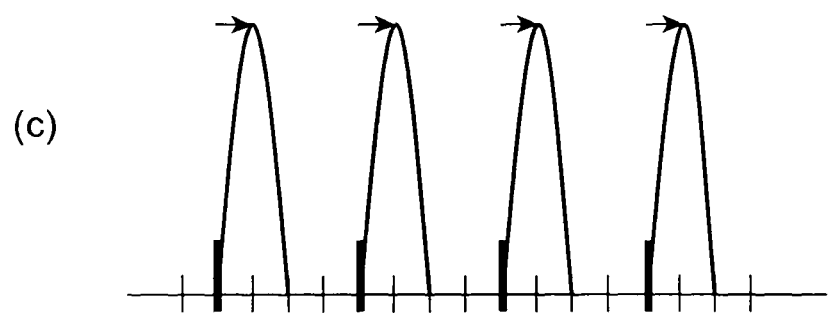

MODULATION DEVICE, MODULATION METHOD, DEMODULATION DEVICE, AND DEMODULATION METHOD

TECHNICAL FIELD

The present invention relates to a sound wave information communication technology of transmitting information by a sound wave.

BACKGROUND ART

The communication technologies of transmitting information by a sound wave include one using an ultrasonic wave and one using an audible sound wave. The use of the audible sound wave out of the two sound waves has the following advantages. First, communication can be performed using a speaker, a microphone, etc. commercially available at present. In addition, since propagation of the sound wave undergoes absorptive attenuation due to the viscosity of media, this absorptive attenuation becomes larger in proportion to the frequency. Therefore, the audible sound wave is less attenuated than the ultrasonic wave and the communication distance can be longer by the audible sound wave than by the ultrasonic wave.

However, when communication is performed by the audible sound wave, a man hears the sound of the transmission signal and thus offensive noise is made to a man. There is thus a technology of superposing the spectrum spread transmission signal on a voice or music (cf. Patent Document 1 below). In this technology described in Patent Document 1, a frequency masking threshold is calculated using the psychoacoustic model, the transmission signal is multiplied by a spread code sequence to obtain a spread signal spread over an entire frequency band, and the spread signal is superposed so as to be not more than the masking threshold.

Patent Document 1 International Publication WO 02/45286

DISCLOSURE OF THE INVENTION

Problem to be Solved by the Invention

In the above method described in Patent Document 1, the spread gain of the spread code needs to be set high in order to extract the transmission signal from the voice or music. However, the increase in the spread gain results in decrease in information volume available for transmission. When the level of the transmission signal is kept at a level below the human auditory sense in practice, information can be transmitted only at the rate of several bits per second by the above method described in Patent Document 1.

The present invention has been accomplished in order to solve the above problem and an object of the invention is to enable transmission of information by the audible sound wave based on a level inoffensive to the human auditory sense and to achieve an improvement in the bit rate of transmitted information.

Means for Solving the Problem

A modulation device of the present invention is a modulation device comprising: modulation means for modulating a carrier in an audible sound range by a baseband signal to generate a modulated signal; masker sound generation means for generating a masker signal outputted as a masker sound for making the modulated signal harder to hear when transmitted with the modulated signal; and acoustic signal generation means for attaching the masker signal to the modulated signal to generate an acoustic signal.

A modulation method of the present invention is a modulation method comprising: a modulation step wherein modulation means modulates a carrier in an audible sound range by a baseband signal to generate a modulated signal; a masker sound generation step wherein masker sound generation means generates a masker signal outputted as a masker sound for making the modulated signal harder to hear when transmitted with the modulated signal; and an acoustic signal generation step wherein acoustic signal generation means attaches the masker signal to the modulated signal to generate an acoustic signal.

In the modulation device and the modulation method of the present invention, since the modulation means modulates the carrier in the audible sound band by the baseband signal to generate the modulated signal, information included in the baseband signal can be changed into a state in which it is put out on the audible sound wave to be transmissible at a higher bit rate. Since the masker sound generating means generates the masker signal outputted as the masker sound for making the modulated signal harder to hear when transmitted with the modulated signal and the acoustic signal generation means attaches the masker signal to the modulated signal to generate the acoustic signal, the audible sound wave to transmit the information can be transmitted in a state in which it is made harder to hear by the masker sound of the masker signal. Namely, the information can be transmitted by the audible sound wave based on the level inoffensive to the human auditory sense and the bit rate of the transmitted information can be improved.

Preferably, the masker sound generation means composes each masker sound inserted in the modulated signal, of a sine wave, and selects a frequency of the masker signal so that frequencies of at least a partial series of masker sounds among the masker sounds constitute a predetermined pattern.

This configuration permits the modulation device to maintain the bit rate of transmitted information and to select the sound pattern played by the masker sounds during transmission of the acoustic signal.

Another modulation device of the present invention is a modulation device comprising: modulation means for matching an amplitude of a carrier in an audible sound region with a spectrum envelope of an acoustic signal and for modulating the carrier by a baseband signal to generate a modulated signal; and acoustic signal generation means for replacing a component in a frequency band of the carrier in the acoustic signal with the modulated signal generated by the modulation means, to generate a synthetic acoustic signal.

Another modulation method of the present invention is a modulation method comprising: a modulation step wherein modulation means matches an amplitude of a carrier in an audible sound region with a spectrum envelope of an acoustic signal and modulates the carrier by a baseband signal to generate a modulated signal; and an acoustic signal generation step wherein acoustic signal generation means replaces a component in a frequency band of the carrier in the acoustic signal with the modulated signal generated in the modulation step, to generate a synthetic acoustic signal.

In the modulation device and the modulation method of the present invention, since the modulation means matches the amplitude of the carrier in the audible sound band with the spectrum envelope of the acoustic signal and modulates the carrier by the baseband signal to generate the modulated signal, the signal is generated corresponding to the audible sound wave to play the sound based on the acoustic signal and the information included in the baseband signal can be changed into a state in which it can be transmitted at a higher bit rate by the audible sound wave. Since the acoustic signal generation means replaces the frequency band of the carrier with the modulated signal to generate the synthetic acoustic signal, the sound based on the acoustic signal can be played and the information can be transmitted at an improved bit rate of transmitted information.

Preferably, when there is a frequency less than a predetermined threshold based on an audible level in the spectrum envelope of the acoustic signal, the modulation means amplifies a power of a spectrum at the frequency to the threshold.

This configuration can improve the SN ratio of the transmitted signal without generation of offensive noise during the transmission.

A demodulation device of the present invention is a demodulation device comprising: coupling means for making a copy of a signal frame of a transmission signal modulated by frequency division multiplexing and for coupling a plurality of signal frames including the signal frame copy and the transmitted signal frame; demodulation means for Fourier-transforming the plurality of signal frames coupled by the coupling means, to demodulate the signal frames; detection means for detecting a deviation of a carrier frequency of the transmission signal in the plurality of signal frames Fourier-transformed by the demodulation means; and correction means for correcting the carrier frequency of the transmission signal on the basis of the deviation of the carrier frequency detected by the detection means.

A demodulation method of the present invention is a demodulation method comprising: a coupling step wherein coupling means makes a copy of a signal frame of a transmission signal modulated by frequency division multiplexing and couples a plurality of signal frames including the signal frame copy and the transmitted signal frame; a demodulation step wherein demodulation means Fourier-transforms the plurality of signal frames coupled in the coupling step, to demodulate the signal frames; a detection step wherein detection means detects a deviation of a carrier frequency of the transmission signal in the plurality of signal frames Fourier-transformed in the demodulation step; and a correction step wherein correction means corrects the carrier frequency of the transmission signal on the basis of the deviation of the carrier frequency detected in the detection step.

In the demodulation device and the demodulation method of the present invention, since the coupling means makes the copy of the signal frame of the transmitted signal modulated by frequency division multiplexing and Fourier-transforms the plurality of coupled signal frames, the width of orthogonal frequencies of signals used in the demodulation can be narrowed. Namely, the frequency resolution can be improved. The improvement in the frequency resolution permits the detection means to appropriately detect the deviation of the carrier frequency of the transmitted signal in the Fourier-transformed signal frames and also permits the correction means to correct the carrier frequency.

Another demodulation device of the present invention is a demodulation device for demodulating an acoustic signal containing a modulated signal, and a masker signal outputted as a masker sound for making the modulated signal harder to hear when transmitted with the modulated signal, the demodulation device comprising: removal means for removing the masker signal from the acoustic signal; and demodulation means for demodulating the acoustic signal from which the masker signal was removed by the removal means.

The demodulation device of the present invention is able to extract the signal included in the modulated signal, from the acoustic signal containing the modulated signal and the masker signal.

Still another demodulation device of the present invention is a demodulation device for demodulating an acoustic signal containing a modulated signal, and a masker signal composed of a frequency associated with a frequency band of a carrier and outputted as a masker sound for making the modulated sound harder to hear when transmitted with the modulated signal, the demodulation device comprising: storage means for storing the frequency band of the carrier and the frequency of the masker signal in association with each other; detection means for Fourier-transforming the masker signal to detect the frequency of the masker signal; and demodulation means for demodulating the acoustic signal in the frequency band stored by the storage means in association with the frequency of the masker signal detected by the detection means.

In the demodulation device of the present invention, since the frequency band of the carrier and the frequency of the masker sound are stored in association with each other and the detection means detects the frequency of the masker signal, it is feasible to provide information necessary for capturing the frequency band of the carrier. Therefore, the demodulation means demodulates the acoustic signal in the frequency band stored by the storage means in association with the frequency of the masker signal detected by the detection means, whereby the demodulation can be appropriately implemented.

Effect of the Invention

The present invention enables information to be transmitted by the audible sound wave based on the level inoffensive to the human auditory sense, and achieves an improvement in the bit rate of transmitted information.

BRIEF DESCRIPTION OF THE DRAWINGS

FIG. 9 is a drawing for explaining a modulation method according to the second embodiment.

FIG. 17 is a drawing for explaining the demodulation method according to the third embodiment.

DESCRIPTION OF REFERENCE SYMBOLS 1T is for transmission data signal; 1R is for transmission data signal; 2 is for error-correcting code device; 3 is for encoded transmission signal; 4A-4C are for modulation devices; 5A is for transmission acoustic signal; 6 is for speaker; 7 is for sound wave; 8 is for microphone; 9A-9C are for reception acoustic signals; 10A-10C are for demodulation devices; 11 is for received transmission signal; 12 is for error-correcting decode device; 13 is for acoustic signal; 14B, 14C are for synthetic acoustic signals; 41 is for S/P conversion unit; 42 is for carriers; 43 is for guard time signal generation unit; 44 is for masker sound generation unit; 45 is for frame synchronization signal generation unit; 46 is for D/A conversion unit; 47 is for spectrum envelope amplitude adjustment unit; 48 is for band-pass filter; 49 is for pilot signal; 51 is for modulation unit; 52 is for acoustic signal generation unit;

53 is for modulation unit; 54 is for acoustic signal generation unit; 101 is for A/D conversion unit; 102 is for frame synchronization unit; 103 is for masker sound & guard time removal unit; 104 is for carriers; 105 is for P/S conversion unit; 106 is for band-pass filter; 107 is for frame synchronization signal; 108 is for OFDM modulation signals; 109 is for phase compensation unit; 110 is for OFDM frame coupling unit; 111 is for sub-carrier selection unit; 112 is for demodulation unit; 113 is for storage unit; 114 is for detection unit; 115 is for guard time removal unit; 116 is for demodulation unit; RS1, RS2 are for acoustic signal reception systems; TS1, TS2 are for acoustic signal transmission systems.

BEST MODE FOR CARRYING OUT THE INVENTION

The systems of the first to third embodiments according to the present invention are sound wave information communication systems for transmitting information by an audible sound wave. The first to third embodiments will be described below with reference to the drawings.

(First Embodiment)

Figure 1:
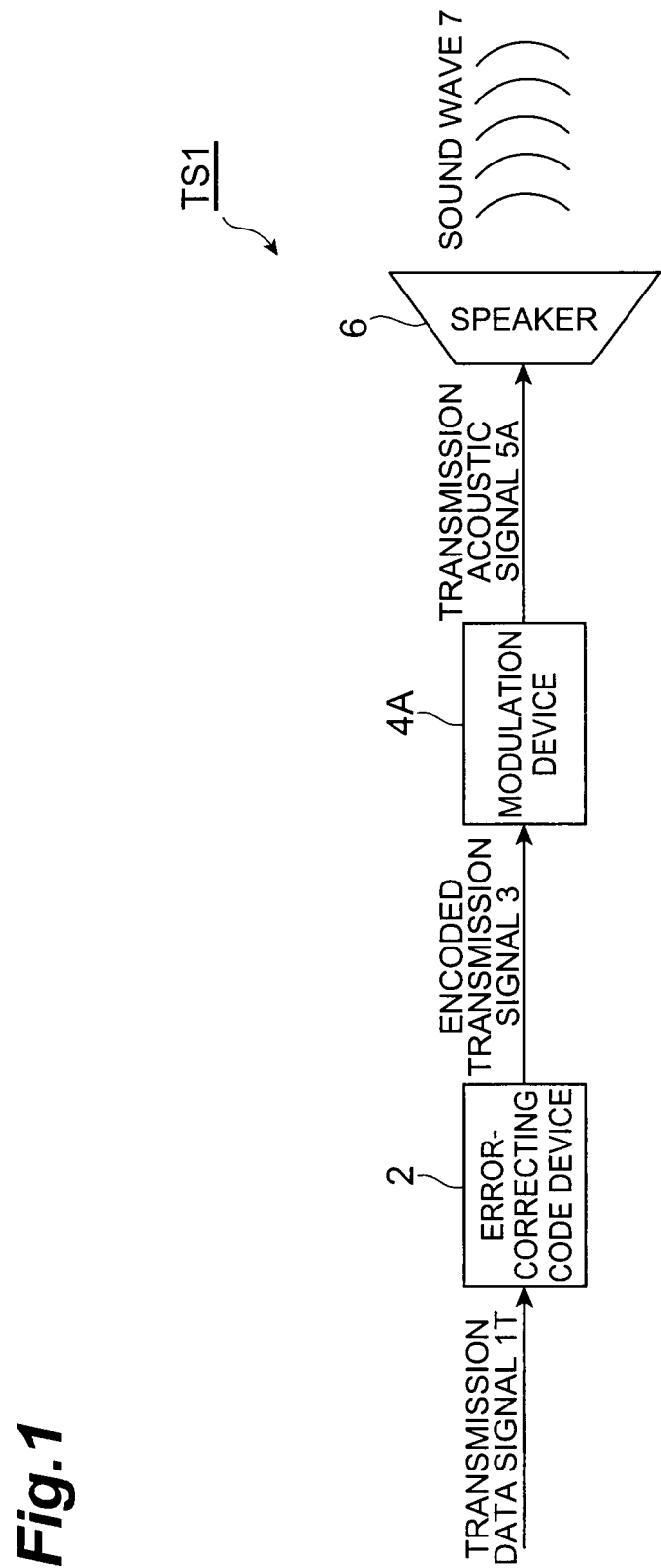
FIG. 1 is a configuration diagram of an acoustic signal transmission system according to the first embodiment.
Figure 2:
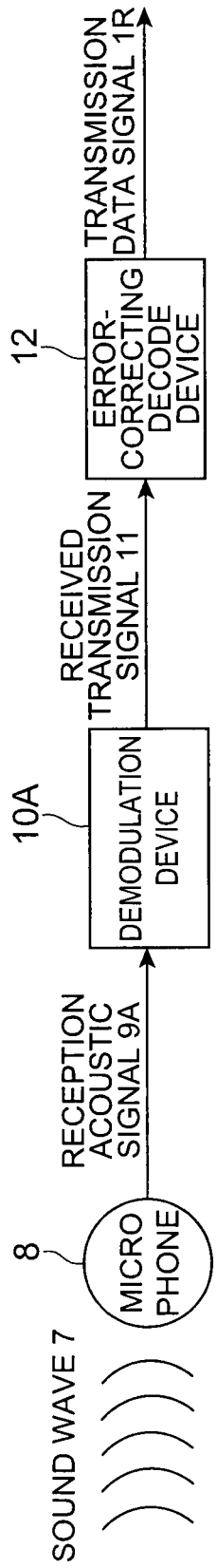
FIG. 2 is a configuration diagram of an acoustic signal reception system according to the first embodiment.
Figure 3:
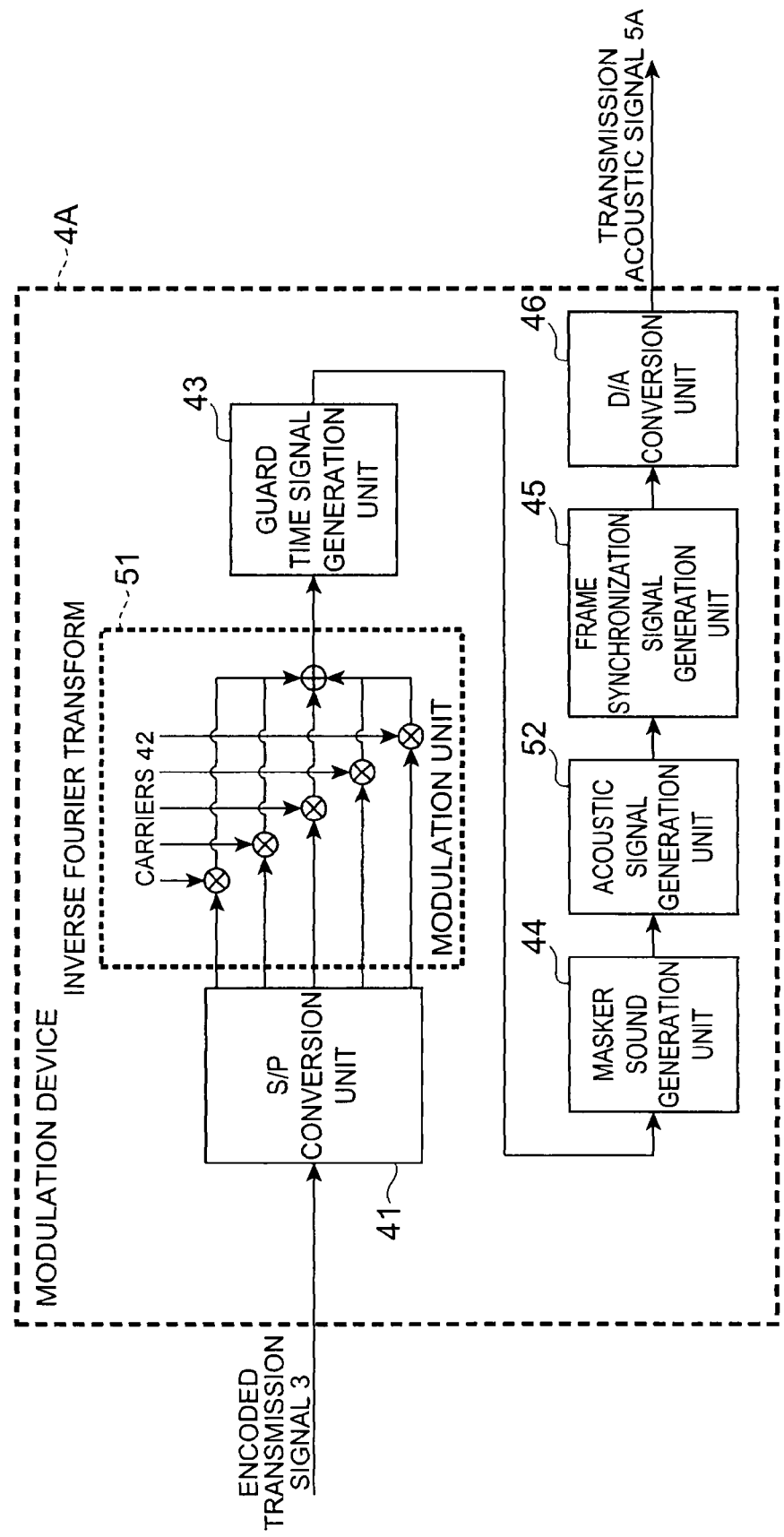
FIG. 3 is a configuration diagram of a modulation device according to the first embodiment.

FIG. 1 shows a configuration diagram of an acoustic signal transmission system TS1 according to the first embodiment and FIG. 2 a configuration diagram of an acoustic signal reception system RS 1 according to the first embodiment. The sound wave information communication system of the present embodiment is composed of the acoustic signal transmission system TS1 and the acoustic signal reception system RS1 shown in FIGS. 1 and 2. In the sound wave information communication system of the present embodiment, the acoustic signal transmission system TS1 puts out a transmission data signal 1T containing transmitted information, on a sound wave 7. Then the acoustic signal reception system RS1 receives the sound wave 7 outputted from the acoustic signal transmission system TS1 and extracts the transmission data signal 1R from the sound wave 7.

The acoustic signal transmission system TS1 is composed of an error-correcting code device 2 for encoding the transmission data signal 1T by an error-correcting code, a modulation device 4A for converting an encoded transmission signal 3 (baseband signal) encoded by the error-correcting code, into a transmission acoustic signal 5A (acoustic signal) being an acoustic signal in the audible sound band, and a speaker 6 for reproducing the transmission acoustic signal 5A as an audible sound wave 7.

The acoustic signal reception system RS1 is composed of a microphone 8 for receiving the sound wave 7 and generating a reception acoustic signal 9A (acoustic signal) being an acoustic signal, a demodulation device 10A for demodulating the reception acoustic signal 9A and extracting a received transmission signal 11, and an error-correcting decode device 12 for correcting an error in the received transmission signal 11 and outputting a transmission data signal 1R.

The modulation device 4A and the demodulation device 10A according to the present embodiment will be described below in detail.

F*ig*. 3 shows a configuration diagram of the modulation device 4A according to the first embodiment. The modulation device 4A is composed of an S/P conversion unit 41, a modulation unit 51 (modulation means), a guard time signal generation unit 43, a masker sound generation unit 44 (masker sound generation means), an acoustic signal generation unit 52 (acoustic signal generation means), a frame synchronization signal generation unit 45, and a D/A conversion unit 46.

The S/P conversion unit 41 receives the input of encoded transmission signal 3 and converts the encoded transmission signal 3 of a single bit stream into parallel bit streams. The S/P conversion unit 41 outputs the parallel bit streams after the conversion to the modulation unit 51.

The modulation unit 51 modulates carriers 42 of respective frequencies by respective parallel transmission bits of the input parallel bit streams and combines signals of the modulated carriers 42 to form a signal frame (modulated signal). The modulation unit 51 performs the modulation using the OFDM modulation method. Namely, the frequencies of the carriers 42 (carrier frequencies) are orthogonal frequencies in mutually orthogonal relation. The carriers 42 are sound waves in the audible sound band. The modulation unit 51 modulates the carriers 42 by the inverse Fourier transform, while assigning the parallel transmission bits as spectral coefficients of the respective carrier frequencies. Then the modulation unit 51 combines the modulated carriers 42 of the respective frequencies to form a signal frame. The modulation unit 51 outputs the signal frame thus formed, to the guard time signal generation unit 43.

The guard time signal generation unit 43 makes a copy of a rear section in the input signal frame and couples the rear section copy as a guard time signal to the head of the signal frame. This guard time signal is effective to avoid multi-path interference among reflected waves and others. The guard time signal generation unit 43 outputs the signal frame and generated guard time signal to the masker sound generation unit 44.

The masker sound generation unit 44 generates a masker signal. The masker signal is a signal that is outputted as a masker sound for the signal frame and the guard time signal when transmitted as the sound wave 7 with the signal frame and the guard time signal. The masker sound is a sound that masks the sound in transmission of the signal frame and the guard time signal to make it harder for a man to hear. The masker sound generation unit 44 selects a sine wave of at least one frequency as a masker sound to generate the masker signal.

The masker sound generation unit 44 selects the frequency of the masker signal so that at least a partial series of frequencies of masker sounds among masker sounds constitute a predetermined pattern. More specifically, the masker sound generation unit 44 selects the frequencies of the inserted masker sounds so that the masker sounds included in the respective signal frames constitute a sequential melody in transmission thereof. The masker sound generation unit 44 may be configured to combine a plurality of sine waves to generate the masker sound and change the tone of the masker sound. Furthermore, the masker sound generation unit 44 selects, as the frequency of the masker sound, a frequency or a frequency pattern associated with the frequency band of the carriers 42. Namely, the generated masker signal comes to contain information indicating the frequency band of carriers 42. The masker sound generation unit 44 outputs the generated masker signal, signal frame, and guard time signal to the acoustic signal generation unit 52.

The acoustic signal generation unit 52 attaches the masker signal to the signal frame to generate an acoustic signal. The acoustic signal generation unit 52 attaches the masker signal to the head of the guard time signal and the back of the signal frame to generate the acoustic signal. Namely, the acoustic signal generation unit 52 generates the acoustic signal in which the masker signal is inserted. The acoustic signal generation unit 52 generates the acoustic signal in such a manner that in the front part of the masker sound section, the preceding signal frame is first faded out and then the masker sound is faded in, in order to prevent a phase discontinuity from occurring between the masker sound and, the guard time and signal frame. Furthermore, the acoustic signal generation unit 52 generates the acoustic signal in such a manner that in the end part of the masker sound, the masker sound is faded out and the guard time is faded in.

More specifically, the acoustic signal generation unit 52 generates a fade-out signal for fading out the preceding signal frame, by making a copy of a front part of the preceding signal frame and coupling the copy to the rear part thereof. The acoustic signal generation unit 52 generates a fade-in signal for fading in the guard time, by preliminarily making the guard time longer. The acoustic signal generation unit 52 outputs the generated acoustic signal to the frame synchronization signal generation unit 45.

The frame synchronization signal generation unit 45 generates a frame synchronization signal and attaches it to the acoustic signal. The frame synchronization signal is a signal for permitting a receiver to identify respective locations of the signal frame, guard time signal, and masker signal included in the acoustic signal. Specifically, the frame synchronization signal is a PN (pseudo noise) signal modulated by the M sequence codes. The frame synchronization signal generation unit 45 outputs the acoustic signal with the frame synchronization signal attached thereto, to the D/A conversion unit 46.

The D/A conversion unit 46 converts the acoustic signal into an analog signal and outputs it as the transmission acoustic signal 5A to the speaker 6.

Figure 4:
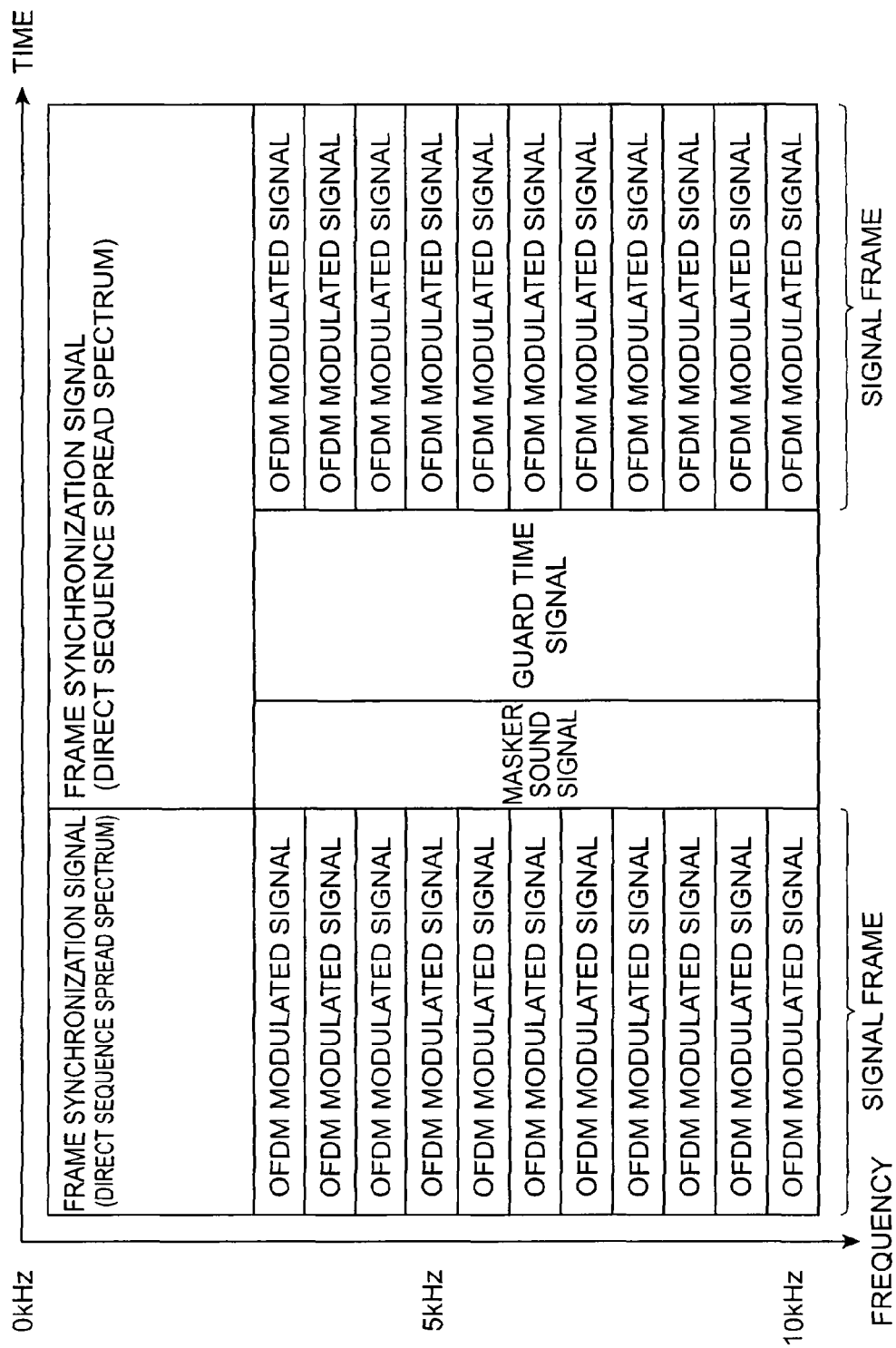
FIG. 4 is a frequency utilization example of a transmission acoustic signal outputted from the modulation device according to the first embodiment.

FIG. 4 shows a frequency utilization example of the signal frame, guard time signal, masker signal, and frame synchronization signal included in the transmission acoustic signal 5A. The head of the frame synchronization signal is matched with a start point of the masker sound. The spectrum spread frame synchronization signal is transmitted in a low sound range where there is a lot of ambient noise. The masker sound, guard time, and signal frame are transmitted in a high sound range. Namely, the frame synchronization signal is transmitted in a frequency band different from that for transmission of the signal frame, guard time, and masker signal.

Figure 5:
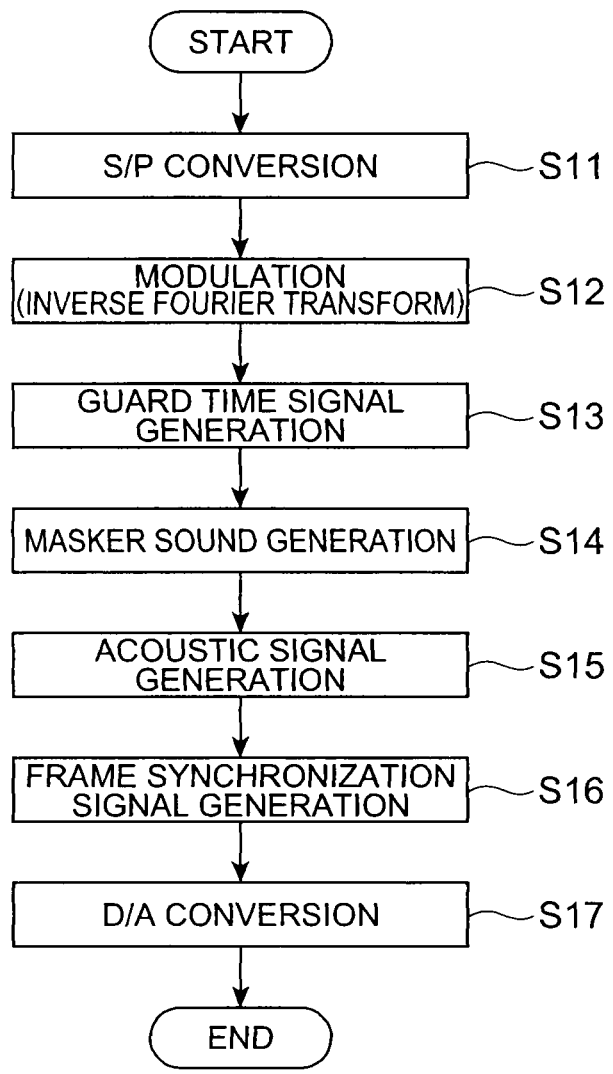
FIG. 5 is a flowchart of a modulation method according to the first embodiment.

Subsequently, a modulation method in the modulation device 4A will be described with reference to FIG. 5. FIG. 5 is a flowchart of the modulation method according to the first embodiment.

First, the S/P conversion unit 41 converts the encoded transmission signal 3 from a single bit stream into parallel bit streams (S11). Then the modulation unit 51 modulates (or inversely Fourier-transforms) the carriers 42 by respective parallel transmission bits of the parallel bit streams and combines the modulated carriers 42 to form the signal frame (S12).

The guard time signal generation unit 43 makes a copy of the rear section of the formed signal frame and couples the copy to the head to generate the guard time signal (S13). After the guard time is generated, the masker sound generation unit 44 generates the masker signal (S14). The acoustic signal generation unit 52 attaches the generated masker signal to the head of the guard time and to the back of the signal frame to generate the acoustic signal (S15).

After the acoustic signal is generated, the frame synchronization signal generation unit 45 generates the PN (pseudo noise) signal modulated by the M sequence codes and attaches it as the frame synchronization signal to the acoustic signal (S16). The acoustic signal generated in this manner is converted into an analog signal by the D/A conversion unit 46 and the analog signal is outputted as the transmission acoustic signal 5A.

The transmission acoustic signal 5A outputted in this manner is outputted as the sound wave 7 from the speaker 6 and the signal propagates in a space while the masker sound based on the masker signal plays a melody. Then the sound wave 7 is received by the microphone 8. The sound wave 7 received by the microphone 8 is outputted as the reception acoustic signal 9A to the demodulation device 10A.

Figure 6:
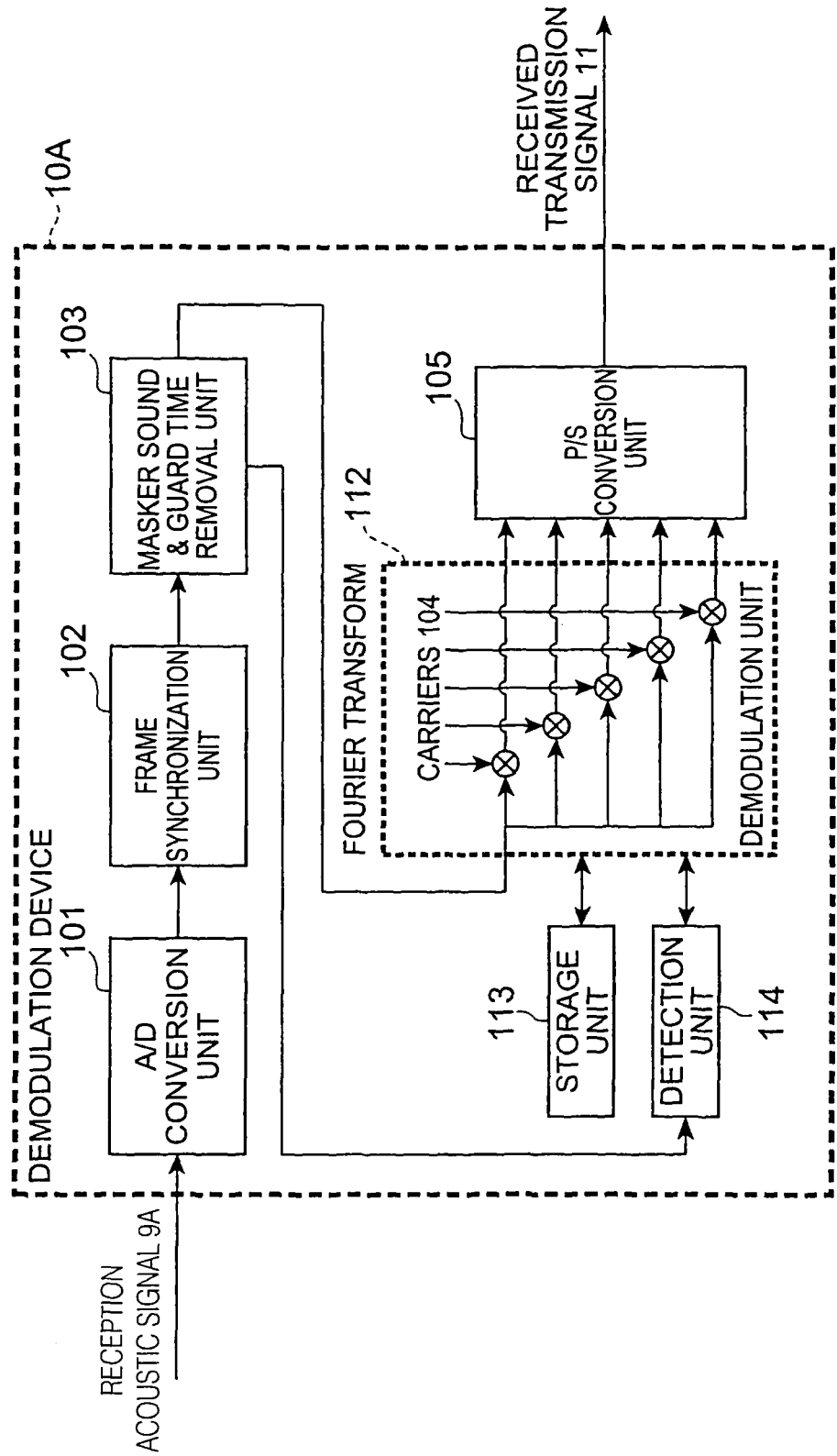
FIG. 6 is a configuration diagram of a demodulation device according to the first embodiment.

The demodulation device 10A will be described below. FIG. 6 shows a configuration diagram of the demodulation device 10A according to the first embodiment. The demodulation device 10A is composed of an A/D conversion unit 101, a frame synchronization unit 102, a masker sound & guard time removal unit 103 (removal means), a demodulation unit 112 (demodulation means), a storage unit 113 (storage means), a detection unit 114 (detection means), and a P/S conversion unit 105.

The A/D conversion unit 101 samples the reception acoustic signal 9A and converts a sampled signal into a digital signal. The A/D conversion unit 101 outputs the digital signal after the conversion, to the frame synchronization unit 102.

The frame synchronization unit 102 checks a correlation of the input digital signal with the PN signal modulated by the M sequence codes while shifting the input digital signal by one sample and several samples at a time, recognizes a point with the highest correlation value as a frame synchronization point, and divides the input digital signal into frame units. The frame synchronization unit 102 outputs segment signals in frame units, to the masker sound & guard time removal unit 103.

The masker sound & guard time removal unit 103 removes the masker signal and the guard time from the segment signal in each divided frame to extract the signal frame. The masker sound & guard time removal unit 103 outputs the extracted signal frame to the demodulation unit 112. The masker sound & guard time removal unit 103 outputs the masker signal removed from the signal frame, to the detection unit 114.

The demodulation unit 112 demodulates the signal frame by each of carriers 104. If signal frames in different frequency bands of carriers 104 are mixed in the signal frames fed into the demodulation unit 112, the demodulation unit 112 demodulates the signal frames corresponding to the respective frequency bands of carriers 104. Namely, the demodulation unit 112 selects a frequency band of carriers 104 for demodulation by making use of functions of the storage unit 113 and detection unit 114.

The storage unit 113 stores the frequency band of carriers 104 and the frequency of the masker signal in association with each other. The frequency of the masker signal may be a specific masker signal included in the acoustic signal, or a frequency pattern constituting a sequential melody. For example, the storage unit 113 stores a frequency band A of carriers 104 and a frequency a of a masker signal in association with each other. Furthermore, for example, the storage unit 113 stores a frequency band B of carriers 104 and frequency pattern information b indicating a frequency pattern of a masker signal.

The detection unit 114 Fourier-transforms the masker signal fed from the masker sound & guard time removal unit 103 to detect the frequency of the masker signal. The detection unit 114 outputs information indicating the detected frequency of the masker signal, to the demodulation unit 112.

When the demodulation unit 112 receives the input of information indicating the frequency of the masker signal, it determines the frequency band of carriers 104 for demodulation, based on the input frequency of the masker signal and the frequency band stored in association therewith by the storage unit 113. Then the demodulation unit 112 demodulates the signal frame by the carriers 104 in the determined frequency band.

For example, in the case of the demodulation by the OFDM demodulation method, the demodulation unit 112 Fourier-transforms the signal frame. The demodulation unit 112 outputs spectral coefficients of the respective carriers 104 obtained by the demodulation, to the P/S conversion unit 105.

The P/S conversion unit 105 extracts parallel transmission bits from the input spectral coefficients. Then the P/S conversion unit 105 converts the extracted parallel transmission bits into a single bit stream and outputs it as the received transmission signal 11.

The demodulation device 10A configured as described above operates as follows. When the reception acoustic signal 9A is received, the A/D conversion unit 101 first converts the reception acoustic signal 9A into a digital signal. The digital signal obtained by the conversion is divided into frame units by the frame synchronization unit 102. The masker sound & guard time removal unit 103 removes the masker signal and the guard time signal from each frame of the segment signal to extract the signal frame. The detection unit 114 Fourier-transforms the removed masker signal to detect the frequency of the masker sound.

The demodulation unit 112 demodulates each of the signal frames extracted, by the carriers 104 in the frequency band stored by the storage unit 113 in association with the detected frequency of the masker sound. The P/S conversion unit 105 extracts parallel transmission bits from spectral coefficients of the carriers 104 obtained by the demodulation. The P/S conversion unit 105 converts the extracted parallel transmission bits into a single bit stream to generate the received transmission signal 11.

The following will describe the operation and effect of the modulation device 4A and modulation method, and the demodulation device 10A and demodulation method according to the first embodiment.

In the above-described modulation device 4A and modulation method, the modulation unit 51 modulates the carriers 42 in the audible sound band by the parallel transmission bits 3 to generate the signal frame, whereby the information included in the parallel transmission bits can be changed into a state in which it can be transmitted at a higher bit rate by the audible sound wave. Then the masker sound generation unit 44 generates the masker signal outputted as the masker sound for making the transmitted sound of the signal frame harder to hear and the acoustic signal generation unit 52 attaches the masker signal to the signal frame to generate the acoustic signal, whereby the acoustic signal can be transmitted in a state in which the audible sound wave to transmit the information is harder to hear. Namely, the information is transmitted by the audible sound wave based on the level inoffensive to the human auditory sense and the bit rate of transmitted information can be increased.

It is also preferable that the masker sound generation unit 44 should compose each masker signal inserted in the modulated signal, from a sine wave and select the frequency of the masker signal so that at least a partial series of frequencies of masker sounds among masker sounds constitute a predetermined pattern. This configuration permits the modulation device to maintain the bit rate of transmitted information and to select a pattern of the sound made by the masker sounds, during transmission of the acoustic signal. Particularly, when the masker sound generation unit 44 selects the frequency of the masker sound so as to constitute a sequential melody during transmission of the masker sounds included in the respective signal frames, the melody can be played during the transmission of the acoustic signal.

Since in the above-described demodulation device 10A the masker sound & guard time removal unit 103 removes the masker signal from the reception modulation signal in each frame unit, to extract the signal frame and the demodulation unit 112 demodulates the signal frame, the information included in the signal frame can be extracted from the acoustic signal containing the signal frame and the masker signal.

Since in the above-described demodulation device 10A the storage unit 113 stores the frequency band of carriers 104 and the frequency of the masker sound in association with each other and the detection unit 114 detects the frequency of the masker signal, it can provide information necessary for capturing the frequency band of carriers. Therefore, the demodulation unit 112 demodulates the acoustic signal in the frequency band stored by the storage unit 113 in association with the frequency of the masker signal detected by the detection unit 114, which enables implementation of appropriate demodulation.

(Second Embodiment)

Figure 7:
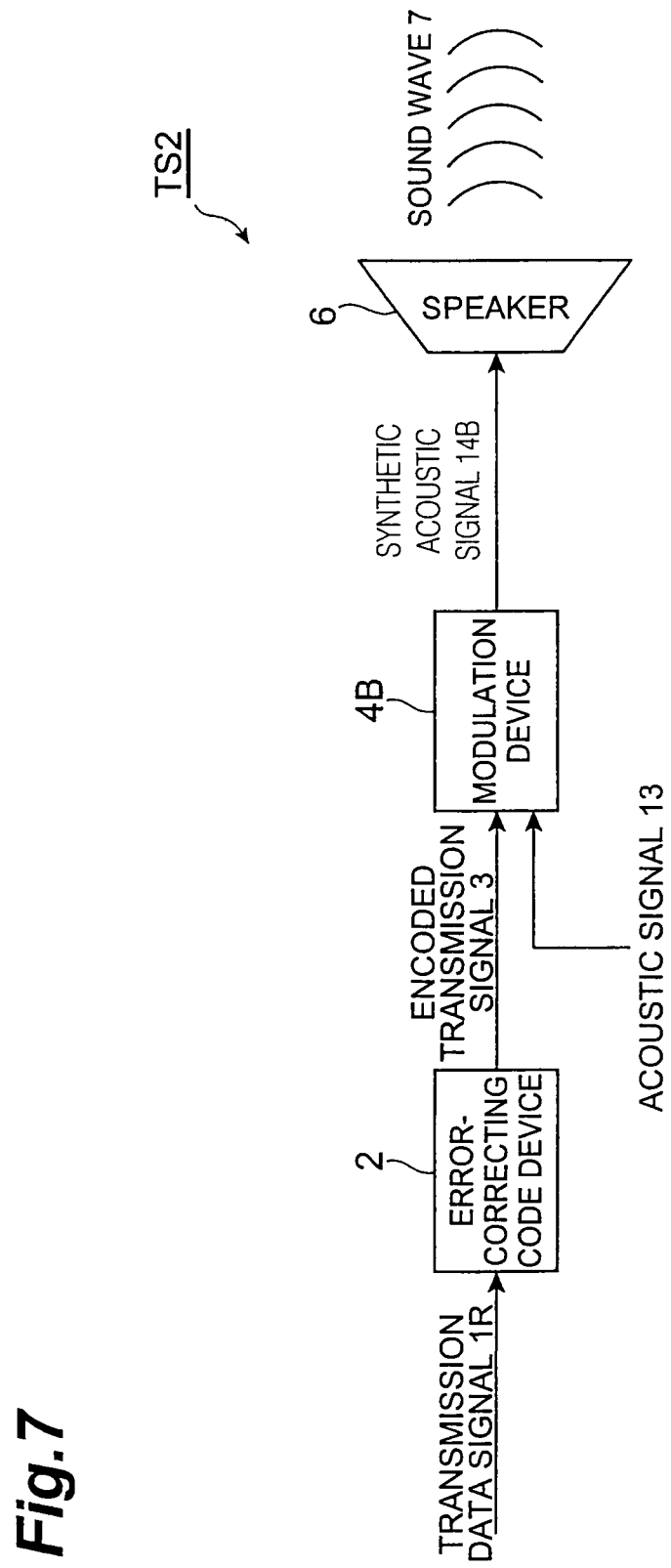
FIG. 7 is a configuration diagram of an acoustic signal transmission system according to the second embodiment.

The sound wave information transmission system according to the present embodiment is a system for transmitting information by reproducing the transmission signal in parallel with a voice or music from the speaker. The sound wave information transmission system of the present embodiment is composed of an acoustic signal transmission system and an acoustic signal reception system. FIG. 7 shows a configuration diagram of the acoustic signal transmission system TS2 according to the second embodiment.

The acoustic signal transmission system TS2 of the present embodiment is composed of an error-correcting code device 2, a modulation device 4B, and a speaker 6. Input signals to the modulation device 4B are an encoded transmission signal 3 and an acoustic signal 13 such as a voice or music. The acoustic signal transmission system TS2 of the present embodiment is different from the acoustic signal transmission system TS1 of the first embodiment in that the modulation device 4B replaces the modulation device 4A and the modulation device 4B receives the input of acoustic signal 13.

The acoustic signal reception system of the present embodiment has a configuration similar to that of the acoustic signal reception system RS1 of the first embodiment, but has a demodulation device 10B instead of the demodulation device 10A.

The modulation device 4B converts the encoded transmission signal 3 into a signal that can be transmitted as an acoustic signal, and combines the resultant signal with the acoustic signal 13 to output a synthetic acoustic signal 14B. The synthetic acoustic signal 14B is received as a reception acoustic signal 9B by the microphone 8 of the acoustic signal reception system. The demodulation device 10B extracts the received transmission signal 11 from the reception acoustic signal 9B. Subsequently, the modulation device 4B and the demodulation device 10B will be described in detail.

Figure 8:
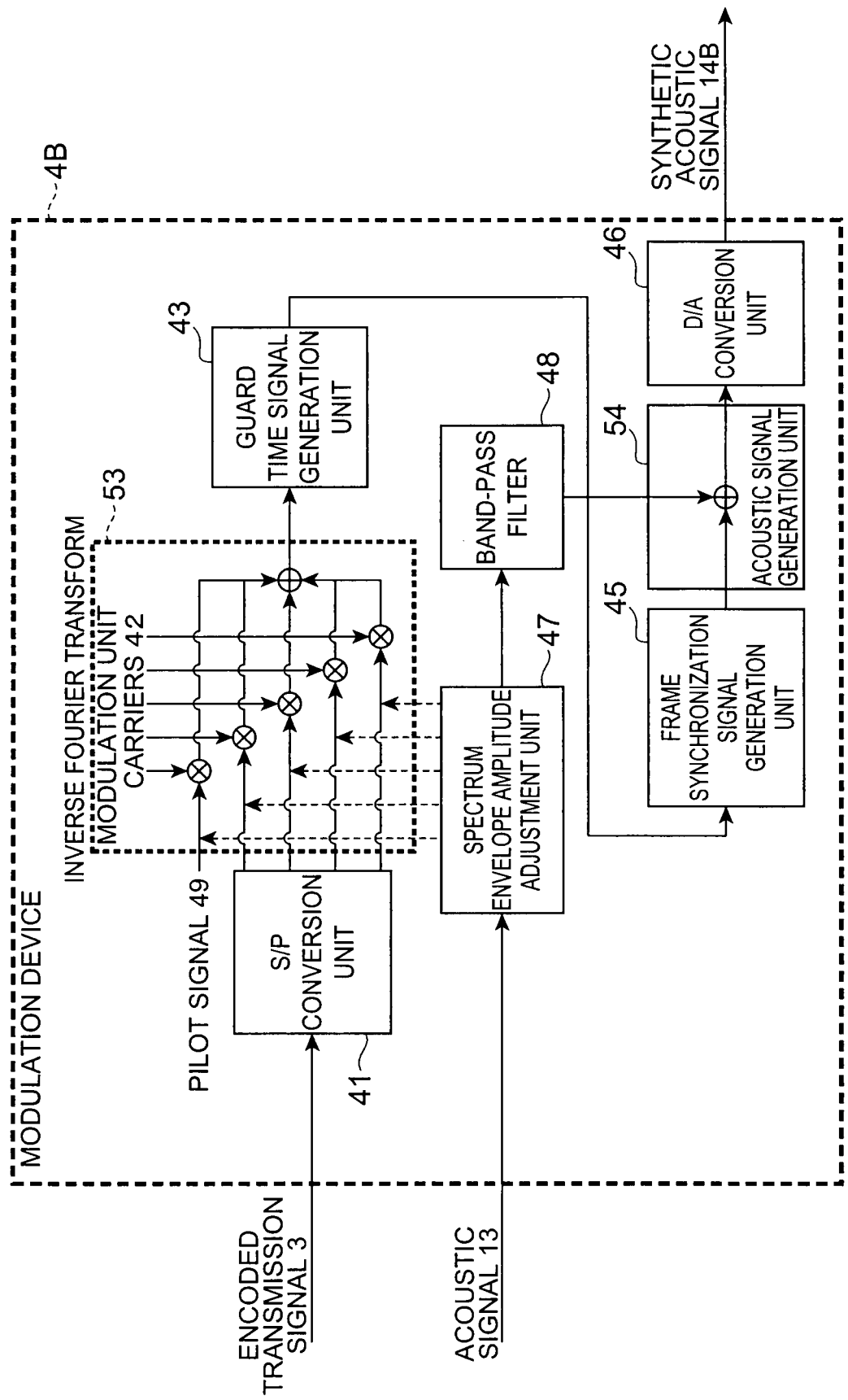
FIG. 8 is a configuration diagram of a modulation device according to the second embodiment.

FIG. 8 shows a configuration diagram of the modulation device 4B according to the second embodiment. The modulation device 4B is composed of an S/P conversion unit 41, a spectrum envelope amplitude adjustment unit 47, a modulation unit 53 (modulation means), a guard time signal generation unit 43, a frame synchronization signal generation unit 45, a band-pass filter 48, an acoustic signal generation unit 54 (acoustic signal generation means), and a D/A conversion unit 46. The functions of the S/P conversion unit 41, guard time signal generation unit 43, frame synchronization signal generation unit 45, and D/A conversion unit 46 are the same as those of the parts included in the modulation device 4A according to the first embodiment, and thus the description thereof is omitted herein.

The spectrum envelope amplitude adjustment unit 47 receives the acoustic signal 13 as an input, Fourier-transforms the input acoustic signal, and calculates a spectrum envelope of the acoustic signal 13. Namely, the spectrum envelope amplitude adjustment unit 47 calculates an amplitude at each frequency of the acoustic signal 13. Then the spectrum envelope amplitude adjustment unit 47 outputs the result of the calculation of the spectrum envelope to the modulation unit 53. The spectrum envelope amplitude adjustment unit 47 outputs the input acoustic signal 13 to the band-pass filter 48.

The modulation unit 53 adds a transmission bit known to a receiver (demodulation device 10B), as a pilot signal 49 in parallel to the parallel bit streams fed from the S/P conversion unit 41. Then the modulation unit 53 adds the amplitude information at each frequency of the acoustic signal 13 in correspondence to each bit of the parallel transmission bits including the pilot signal 49, based on the calculation result of the spectrum envelope outputted from the spectrum envelope amplitude adjustment unit 47. Then the modulation unit 53 modulates the carriers 42 by respective transmission bits with the amplitude information of the acoustic signal 13 added.

In this manner, the modulation unit 53 matches the amplitude of each carrier 42 with the spectrum envelope of the acoustic signal 13 and modulates each carrier 42 by each bit of the parallel transmission bits including the pilot signal 49. The modulation unit 53 performs the modulation using the OFDM modulation method. Namely, the modulation unit 53 modulates the carriers by the inverse Fourier transform, using the orthogonal frequencies in mutually orthogonal relation as frequencies of the carriers 42 and assigning the spectrum envelope and the parallel transmission bits as spectral coefficients of the respective carrier frequencies.

When there is a frequency less than a predetermined threshold based on the audible level, in the spectrum envelope indicated by the calculation result, the modulation unit 53 amplifies the power of the spectrum at the frequency to the threshold. The threshold is set, for example, to a value not more than the audible level or not more than a value in a permissible range. The modulation unit 53 combines signals of modulated carriers 42 to form a signal frame. The modulation unit 53 outputs the formed signal frame to the guard time signal generation unit 43.

The band-pass filter 48 removes components in the frequency band of carriers 42 in the input acoustic signal 13 and outputs the resultant to the acoustic signal generation unit 54.

The acoustic signal generation unit 54 superposes the acoustic signal 13 outputted from the band-pass filter 48, on the frame signal, guard time signal, and frame synchronization signal outputted from the frame synchronization signal generation unit 45, to generate a synthetic acoustic signal 14B. Namely, the acoustic signal generation unit 54 replaces the components in the frequency band of carriers 42 in the acoustic signal 13 with the modulated signal to generate the synthetic acoustic signal 14B. The acoustic signal generation unit 54 outputs the generated synthetic acoustic signal 14B to the D/A conversion unit 46.

The generation method of the synthetic acoustic signal will be described in more detail with reference to Fig. 9. Fig. 9(a) shows an example of a spectrum of the acoustic signal 13. As shown in Fig. 9(b), the band-pass filter 48 removes components in the frequency band D of carriers 42 from the acoustic signal 13 shown in Fig. 9(a). In Fig. 9(b), a solid line part indicates the acoustic signal 13 from which the components in the frequency band D are removed, and a dotted line indicates the removed frequency band D.

The modulation unit 53 matches the amplitude at each carrier 42 with the spectrum envelope, as shown in Fig. 9(c), to modulate each carrier 42, thereby generating a modulated signal 42F. The acoustic signal generation unit 54 superposes the modulated signal 42F on the acoustic signal 13 from which the components in the frequency band D are removed, to generate the synthetic modulation signal 14B.

Figure 10:
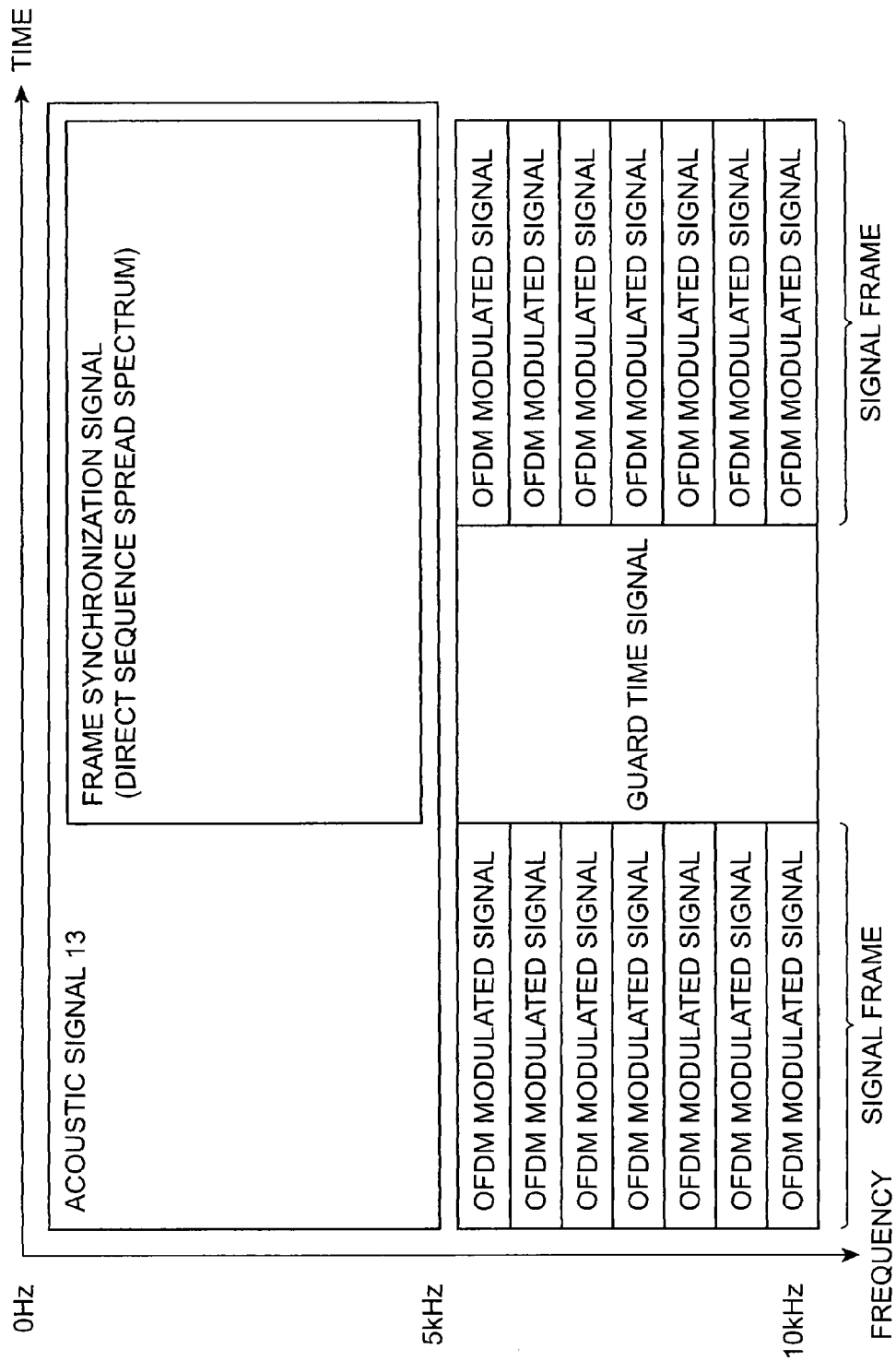
FIG. 10 is an example of frequency utilization arrangement of a transmission acoustic signal outputted from the modulation device according to the second embodiment.

FIG. 10 shows a frequency utilization example of the signal frame, guard time signal, masker signal, and frame synchronization signal included in the synthetic acoustic signal 14B. The head of the frame synchronization signal is matched with a start point of the guard time. The spectrum spread frame synchronization signal is transmitted in the low sound range where the components of the acoustic signal 13 remain. The guard time and signal frame are transmitted in the high sound range. Namely, the frame synchronization signal is transmitted in the frequency band different from the frequency band for transmission of the signal frame and the guard time.

Figure 11:
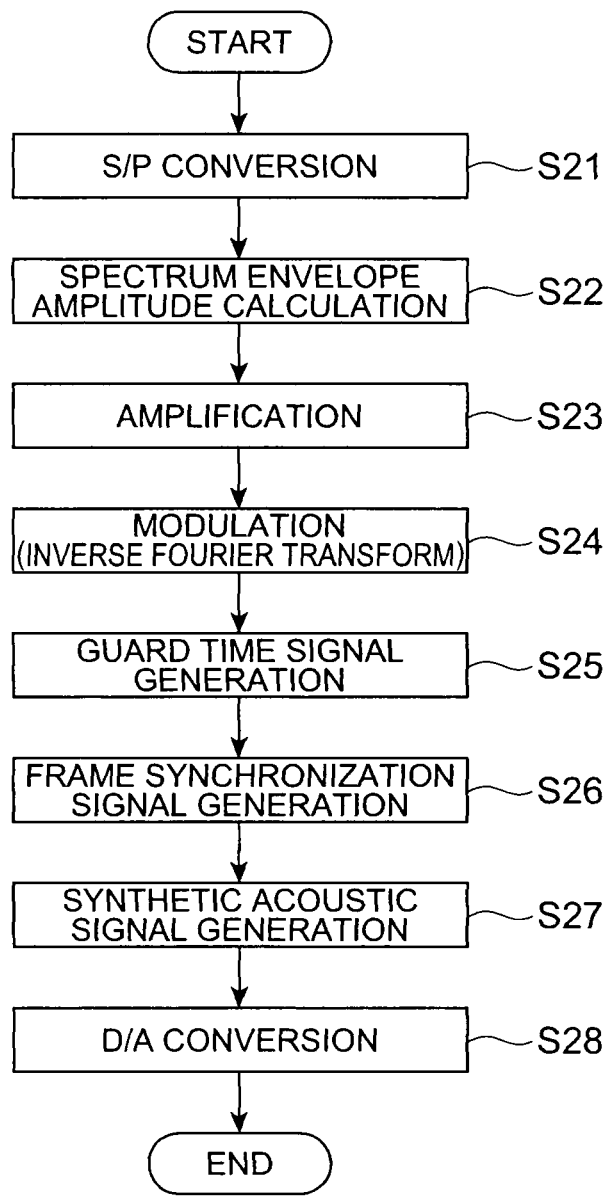
FIG. 11 is a flowchart of a modulation method according to the second embodiment.

Subsequently, the modulation method in the modulation device 4B will be described with reference to FIG. 11. FIG. 11 is a flowchart of the modulation method according to the second embodiment.

First, the S/P conversion unit 41 converts the encoded transmission signal 3 from a single bit stream into parallel bit streams (S21). The spectrum envelope amplitude adjustment unit 47 calculates the spectrum envelope of the acoustic signal 13 (S22). If there is a frequency of the acoustic signal 13 less than the threshold, the modulation unit 53 amplifies the power at the relevant frequency (S23).

Thereafter, the amplitude information at each frequency of the acoustic signal 13 indicated by the calculation result of the spectrum envelope is added in correspondence to each bit of the parallel transmission bits including the pilot signal 49. Then the carriers 42 are modulated by the respective transmission bits with the amplitude information of the acoustic signal 13 added. Namely, the modulation unit 53 adjusts the amplitudes of carriers 42 so as to match the spectrum envelope of the acoustic signal 13 and modulates (or inversely Fourier-transforms) each carrier 42 by each transmission bit.

Then the signals of the respective carriers 42 thus modulated are combined to form a signal frame (S24).

The guard time signal generation unit 43 makes a copy of the rear section of the formed signal frame and couples the copy to the head to generate a guard time signal (S25). After the guard time is generated, the PN (pseudo noise) signal modulated by the M sequence codes is generated by the frame synchronization signal generation unit 45 and is attached as a frame synchronization signal to the signal frame (S26).

The acoustic signal generation unit 54 superposes the acoustic signal 13 from which the frequency band of carriers 42 is removed, on the signal frame to generate the synthetic acoustic signal (S27). The D/A conversion unit 46 converts the generated synthetic acoustic signal 14B into an analog signal and outputs the analog signal (S28).

The synthetic acoustic signal 14B outputted in this manner is outputted as a sound wave 7 from the speaker 6 to play a melody based on the acoustic signal 13 and the signal propagates in a space. Then the sound wave 7 is received by the microphone 8 included in the acoustic signal reception system. The sound wave 7 received by the microphone 8 is outputted as the reception acoustic signal 9B to the demodulation device 10B.

Figure 12:
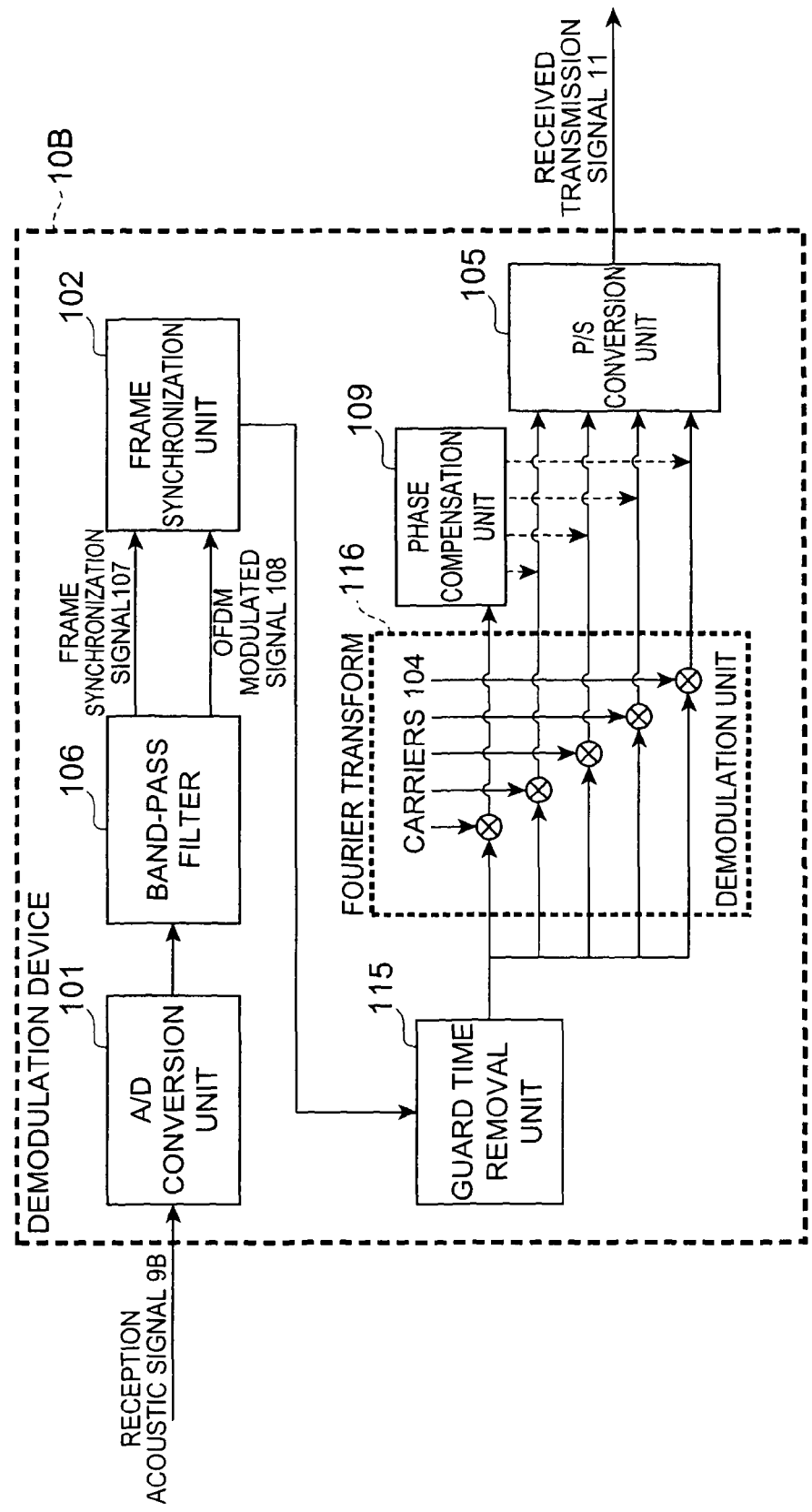
FIG. 12 is a configuration diagram of a demodulation device according to the second embodiment.

The demodulation device 10B will be described below. FIG. 12 shows a configuration diagram of the demodulation device 10B according to the second embodiment. The demodulation device 10B is composed of an A/D conversion unit 101, a band-pass filter 106, a frame synchronization unit 102, a guard time removal unit 115, a demodulation unit 112, a phase compensation unit 109, and a P/S conversion unit 105. Among these, the A/D conversion unit 101, frame synchronization unit 102, and P/S conversion unit 105 have the same functions as the parts in the demodulation device 10A of the first embodiment described above, and thus the description thereof is omitted herein.

The band-pass filter 106 receives an input of the digital signal outputted from the A/D conversion unit 101 and divides the input digital signal into the band where the frame synchronization signal component exists, and the band where the signal frame component exists. Let us define the signal in the band where the frame synchronization signal component exists, as a frame synchronization signal 107 and the signal in the band where the signal frame component exists, as an OFDM modulation signal 108. The band-pass filter 106 outputs each of the frame synchronization signal 107 and the OFDM modulation signal 108 to the frame synchronization unit 102.

The frame synchronization unit 102 checks a correlation of the frame synchronization signal 107 with the PN signal modulated by the M sequence codes, while shifting the frame synchronization signal 107 by a sample and several samples at a time, and recognizes a point with the highest correlation value as a frame synchronization point. Then the frame synchronization unit 102 divides the OFDM modulation signal 108 into frame units in accordance with the recognized frame synchronization point. The frame synchronization unit 102 outputs the divided OFDM modulation signal 108 to the guard time removal unit 115.

The guard time removal unit 115 removes the guard time from each segment frame to extract the signal frame. The guard time removal unit 115 outputs the extracted signal frame to the demodulation unit 116.

The demodulation unit 116 demodulates the extracted signal frame by each carrier 104. The demodulation unit 116 Fourier-transforms the signal frame to implement demodulation according to the OFDM demodulation method.

The phase compensation unit 109 extracts the pilot signal from the demodulated carriers 104. Then the phase compensation unit 109 compares the spectral coefficient of the extracted pilot signal with the spectral coefficient of the known pilot signal 49 to detect a signal change in the pilot signal. Then the phase compensation unit 109 compensates the signals of the other carriers 104 on the basis of the detected signal change. The phase compensation unit 109 outputs the compensated signals to the P/S conversion unit 105.

The P/S conversion unit 105 extracts the parallel transmission bits from the input signals. Then the P/S conversion unit 105 converts the extracted parallel transmission bits into a single bit stream and outputs the single bit stream as a received transmission signal 11.

The demodulation device 10B configured as described above operates as follows. When the reception acoustic signal 9B is received, the A/D conversion unit 101 first converts the reception acoustic signal 9B into a digital signal. The band-pass filter 106 divides the digital signal obtained by the conversion, into the frame synchronization signal 107 and the OFDM modulation signal 108. The frame synchronization unit 102 divides the OFDM modulation signal 108 into frame units on the basis of the frame synchronization signal 107. The guard time removal unit 115 removes the guard time signal from each frame of the divided digital signal to extract the signal frame.

The demodulation unit 116 demodulates each extracted signal frame by the carriers 104. The phase compensation unit 109 extracts the pilot signal from the demodulated signal frame and compensates the signals of the other carriers 104 on the basis of the change between the extracted pilot signal and the known pilot signal 49. After the compensation for the carriers 104, the P/S conversion unit 105 extracts the parallel transmission bits from the spectral coefficients of the carriers 104. The P/S conversion unit 105 converts the extracted parallel transmission bits into a single bit stream to generate the received transmission signal 11.

The following will describe the operation and effect of the modulation device 4B, modulation method, and demodulation device 10B according to the second embodiment.

In the above-described modulation device 4B and modulation method, the modulation unit 53 matches the amplitudes of the carriers 42 in the audible sound band with the spectrum envelope of the acoustic signal 13 and modulates the carriers 42 by the baseband signal to generate the modulated signal, whereby it generates an audible sound wave to play the sound based on the acoustic signal 13 and the signal included in the baseband signal is changed into a state in which the signal can be transmitted at a higher bit rate by the audible sound wave. Since the acoustic signal generation unit 54 replaces the frequency band of carriers 42 with the modulated signal to generate the synthetic acoustic signal, the information can be transmitted while playing the sound based on the acoustic signal 13 and improving the transmission information bit rate.

If there is a frequency less than the predetermined threshold based on the audible level in the spectrum envelope of the acoustic signal 13, the modulation unit 53 amplifies the power of the spectrum at the frequency to the threshold, whereby the SN ratio of the transmitted signal can be improved without generation of unpleasant sound during transmission.

Since the phase compensation unit 109 compensates the signal by estimating the change in the signals of the other carriers 42 from the change in the signal of the carrier 42 modulated by the known signal (e.g., the pilot signal), compensation can be made for a change in the amplitude or phase of the signal caused during propagation of the signal. Therefore, the demodulation device can reduce errors in identification of signals due to the change in the signals.

The modulation device 4A is configured to modulate the specific carrier 42 included in the signal frame, by the pilot signal 49 and the demodulation device 10B is configured to compensate the signals of the other carriers 42 on the basis of the signal change of the specific carrier 42. In contrast to it, it is also possible to adopt a configuration wherein all the carriers 42 in a specific signal frame are modulated by the pilot signal 49 and wherein compensation is made for signals of the same carriers 42 in the other signal frames, based on changes in the signals of the respective carriers 42 in the specific signal frame. In this manner, the compensation for the signals may be made by estimating changes in signals in other time zones from changes in signals in a certain time zone modulated by the known signal. This configuration can reduce errors in identification of signals due to the change in the signals.

(Third Embodiment)

The sound wave information transmission system according to the present embodiment is a system for implementing transmission while reproducing the sound from the speaker with the transmission signal and the masker sound being added in parallel with the voice or music as in the case of the second embodiment. This sound wave information transmission system is arranged to correct a fine deviation of a sampling frequency between the transmitter side and the receiver side, on the receiver side.

The sound wave information transmission system according to the present embodiment is composed of an acoustic signal transmission system (transmitter side) and an acoustic signal reception system (receiver side) as the sound wave information transmission system of the second embodiment was. The modulation device 4C of the present embodiment converts the encoded transmission signal 3 so as to be transmissible as a sound wave, and combines it with the acoustic signal 13 to output a synthetic acoustic signal 14B. The demodulation device 10C extracts the received transmission signal 11 from the reception acoustic signal 9C.

The acoustic signal transmission system of the present embodiment has a configuration similar to that of the acoustic signal transmission system TS2 in the second embodiment, but has the modulation device 4C instead of the modulation device 4B. The acoustic signal reception system of the present embodiment has a configuration similar to that of the acoustic signal reception system in the second embodiment, but has the demodulation device 10C instead of the demodulation device 1013. Subsequently, the modulation device 4C and the demodulation device 10C will be described in detail.

Figure 13:
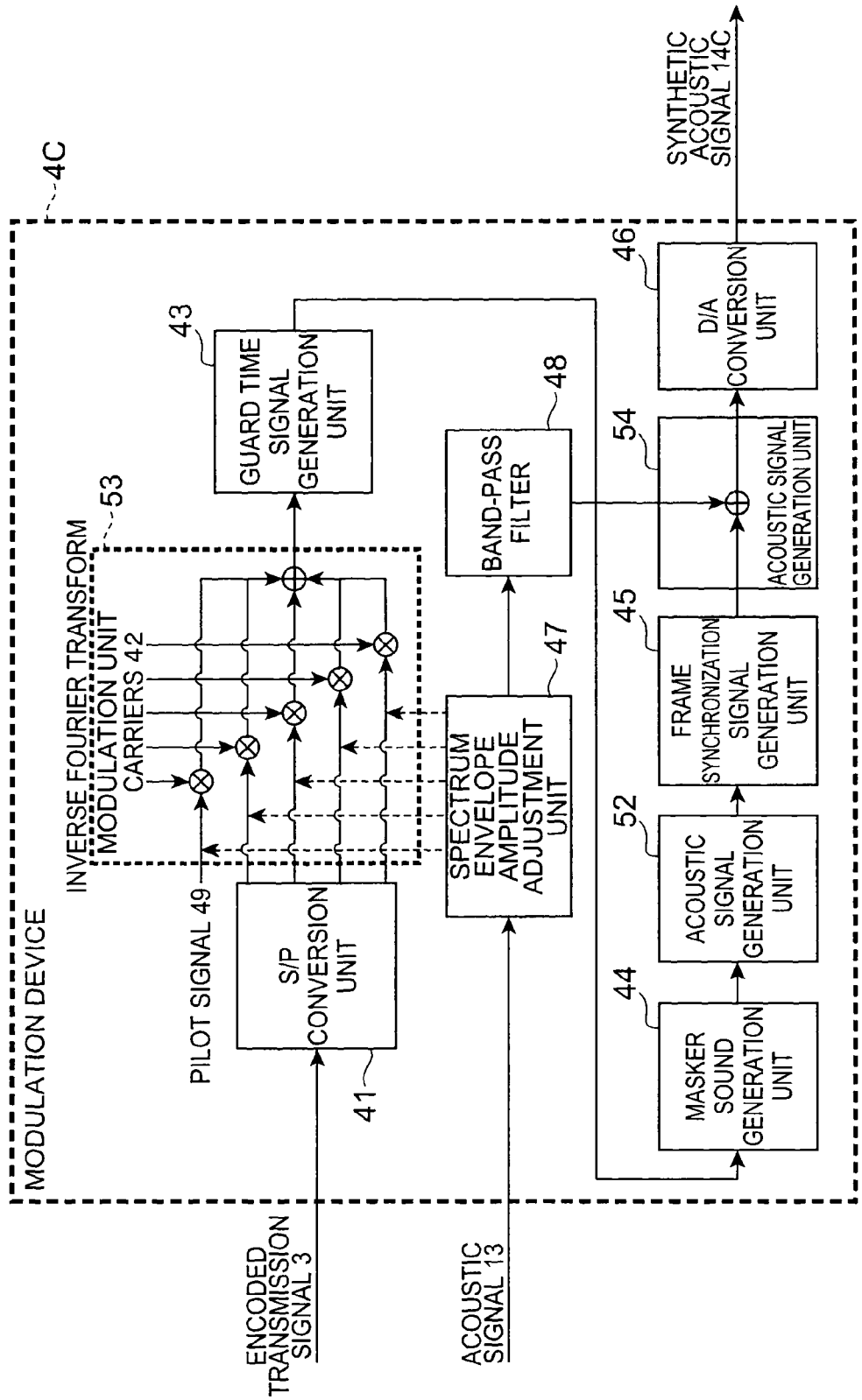
FIG. 13 is a configuration diagram of a modulation device according to the third embodiment.

FIG. 13 shows a configuration of the modulation device 4C according to the third embodiment. The modulation device 4C is composed of an S/P conversion unit 41, a spectrum envelope amplitude adjustment unit 47, a modulation unit 53, a guard time signal generation unit 43, a masker sound generation unit 44, an acoustic signal generation unit 52, a frame synchronization signal generation unit 45, a band-pass filter 48, an acoustic signal generation unit 54, and a D/A conversion unit 46. These components have the same functions as those of the components included in the modulation devices 4B, 4C of the first embodiment and the second embodiment, and the detailed description of each component is thus omitted herein.

Subsequently, a modulation method in the modulation device 4C will be described. First, the encoded transmission signal 3 is fed into the S/P conversion unit 41 and the S/P conversion unit 41 converts the encoded transmission signal 3 of a single bit stream into parallel bit streams. The modulation unit 53 adds the pilot signal 49 in parallel to the parallel bit streams obtained by the conversion. On the other hand, the spectrum envelope amplitude adjustment unit 47 receives the input of acoustic signal 13 and calculates the spectrum envelope.

Using the calculated spectrum envelope, the amplitudes of the respective carriers 42 are adjusted so as to match the spectrum envelope of the acoustic signal 13 and the modulation unit 53 modulates each carrier 42 by each bit of the parallel transmission bits including the pilot signal 49. The modulation unit 53 combines the signals of the respective modulated carriers 42 to form a signal frame. The guard time signal generation unit 43 makes a copy of the rear section of the signal frame and couples it as a guard time signal to the head of the signal frame.

The masker sound generation unit 44 generates the masker signal of the masker sound for masking this signal frame and guard time signal. The acoustic signal generation unit 52 attaches the generated masker signal to the head of the guard time signal and the back of the signal frame. The frame synchronization signal generation unit 45 then generates the frame synchronization signal for letting the receiver identify the locations of the signal frame, guard time signal, and masker signal, and attaches it to the signal frame.

On the other hand, the band-pass filter 48 removes components in the carrier frequency band from the acoustic signal 13 fed from the spectrum envelope amplitude adjustment unit 47. The acoustic signal generation unit 54 superposes the acoustic signal 13 from which the frequency band of carriers 42 is removed, on the signal frame, guard time signal, and masker signal to generate a synthetic acoustic signal. The D/A conversion unit 46 converts the generated synthetic acoustic signal 14C into an analog signal and outputs the analog signal.

Figure 14:
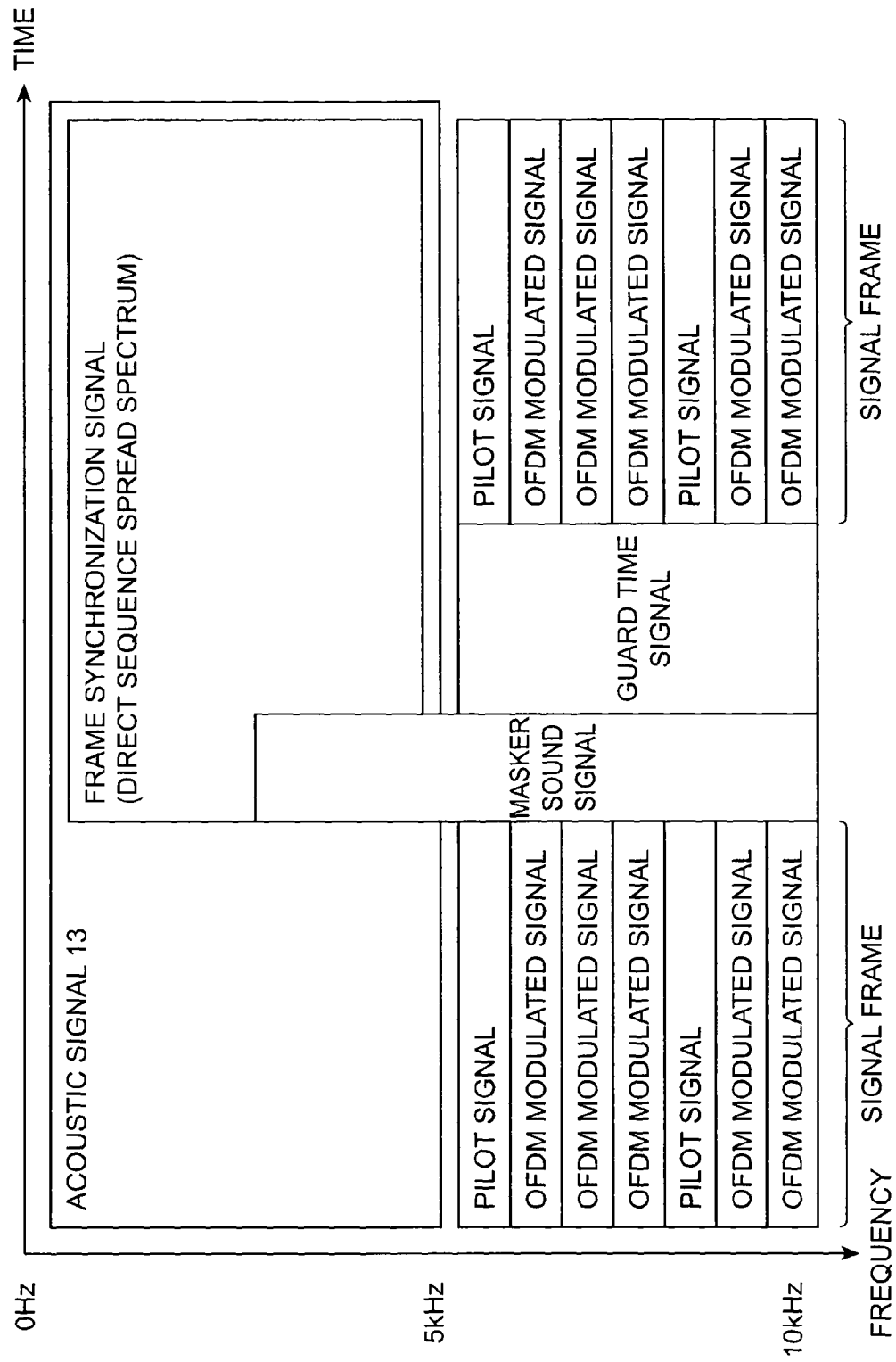
FIG. 14 is an example of frequency utilization arrangement of a transmission acoustic signal outputted from the modulation device according to the third embodiment.

Fig. 14 shows an example of frequency utilization arrangement of the signal frame, guard time signal, masker signal, frame synchronization signal, and acoustic signal 13 included in the synthetic acoustic signal 14C generated as described above. The frame synchronization signal is transmitted in the frequency band different from that of the carriers 42. Namely, the spectrum spread frame synchronization signal is transmitted in the low sound range where components of the acoustic signal 13 remain. The masker sound forms a melody using frequencies in both of the low sound range and the high sound range. The guard time and signal frame are transmitted in the high sound range. The head of the frame synchronization signal is matched with the head of the masker sound section.

The masker sound may be inserted at any location in the band different from the carrier frequency band. In that case, the guard time signal becomes adjacent to the preceding signal frame and a discontinuity appears between the phase of the guard time signal and the phase of the preceding signal frame. Therefore, the discontinuous phase part is smoothed, or the masker sound is inserted near the border between the preceding signal frame and the guard time signal so as to mask the discontinuous phase part.

Figure 15:
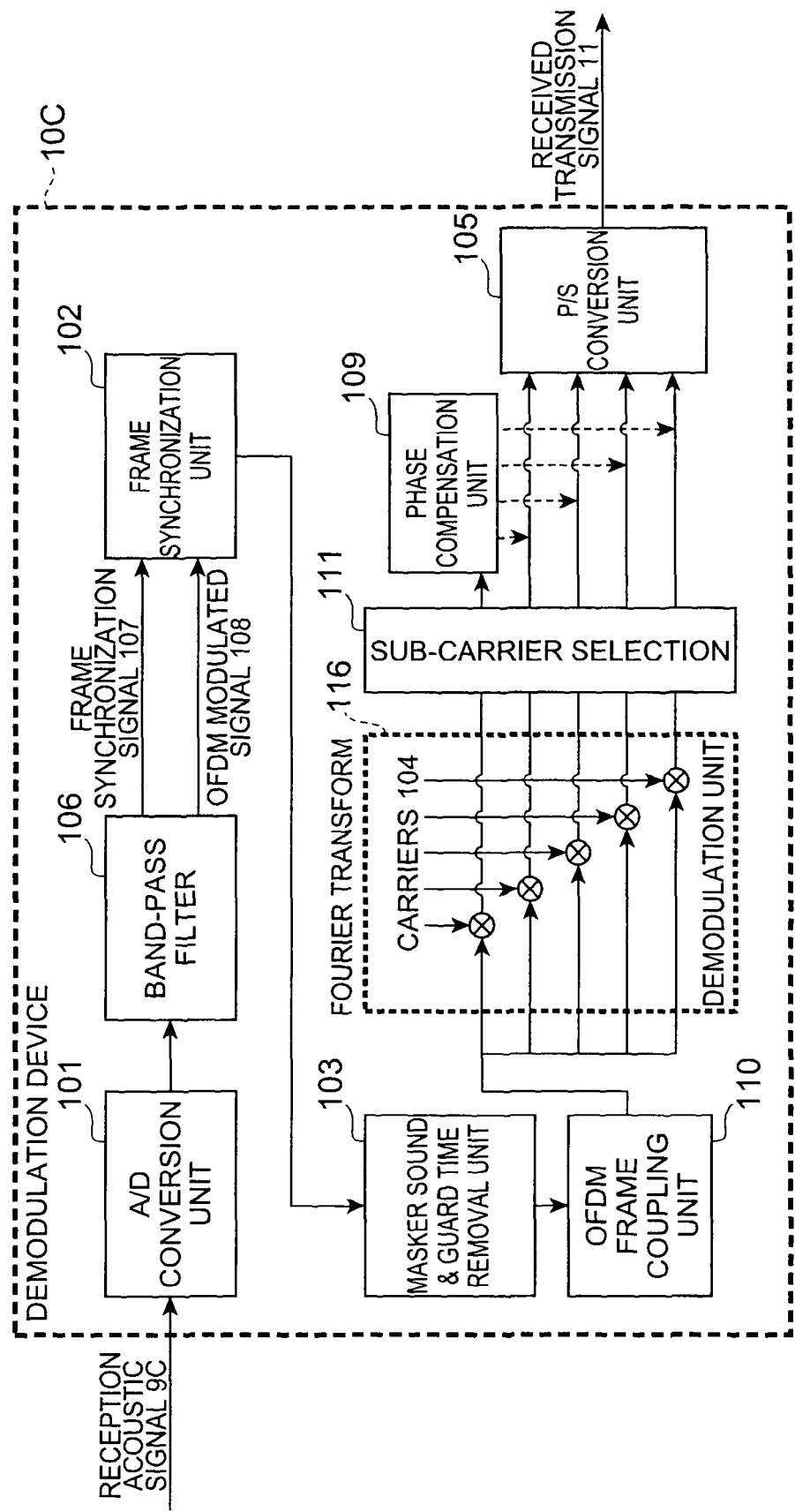
FIG. 15 is a configuration diagram of a demodulation device according to the third embodiment.

The demodulation device 10C will be described below. FIG. 15 shows a configuration of the demodulation device 10C according to the third embodiment. The demodulation device 10C is a device for demodulating the reception acoustic signal 9C modulated by frequency division multiplexing. In the present embodiment, the reception acoustic signal 9C is a signal modulated by the OFDM modulation method. The demodulation device 10C is composed of an A/D conversion unit 101, a band-pass filter 106, a frame synchronization unit 102, a masker sound & guard time removal unit 103, an OFDM frame coupling unit 110 (coupling means), a demodulation unit 116, a sub-carrier selection unit 111 (detection means and correction means), a phase compensation unit 109, and a P/S conversion unit 105. The components in the demodulation devices 10A and 10B also have the same functions in the demodulation device 10C.

Figure 16:
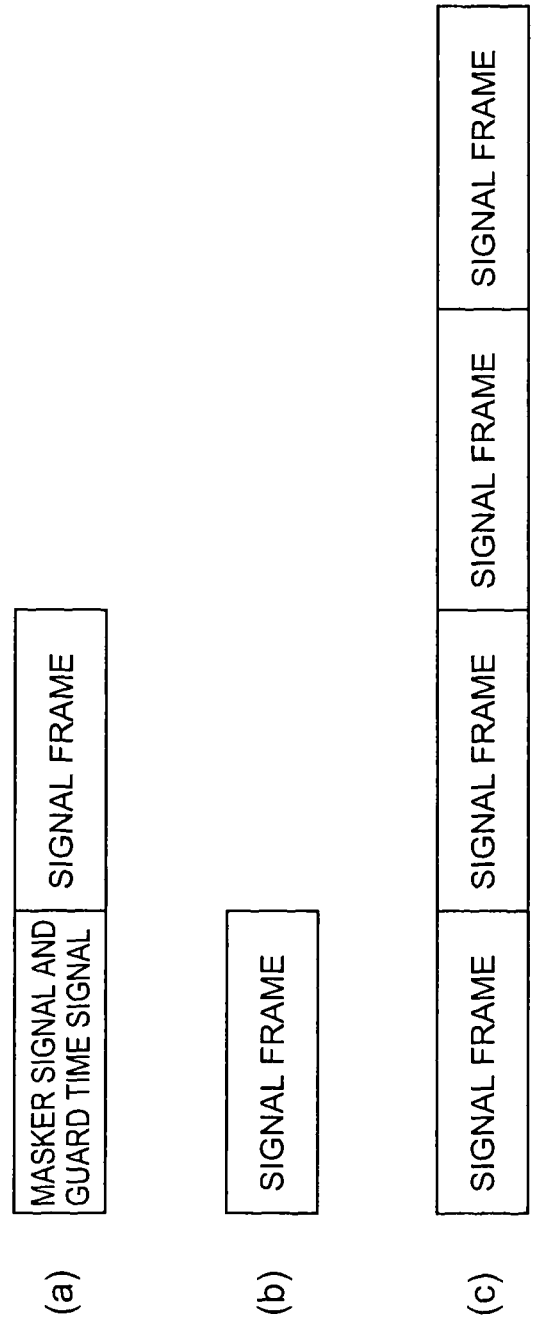
FIG. 16 is a drawing for explaining a demodulation method according to the third embodiment.

The following will describe the OFDM frame coupling unit 110 and the sub-carrier selection unit 111, while describing the masker sound & guard time removal unit 103 and the demodulation unit 116 in association therewith, with reference to FIG. 16 and FIG. 17. FIGS. 16 and 17 are drawings for explaining the demodulation method according to the third embodiment.

FIG. 16(a) shows a signal in which the masker signal and guard time signal are combined with the OFDM modulated signals. The masker sound & guard time removal unit 103 removes the masker signal and guard time signal from the synthetic signal shown in FIG. 16(a), to extract the signal frame. FIG. 16(b) shows one signal frame. The masker sound & guard time removal unit 103 outputs the extracted signal frame to the OFDM frame coupling unit.

The OFDM frame coupling unit 110 makes a copy of the signal frame and couples the copy to the signal frame. For example, the OFDM frame coupling unit 110 makes four copies of one signal frame as shown in FIG. 16(c) and couples the four signal frame copies. The OFDM frame coupling unit 110 outputs the plurality of signal frames thus coupled, to the demodulation unit 116.

The demodulation unit 116 Fourier-transforms the plurality of coupled signal frames by the OFDM demodulation method. The following will describe the effect of the demodulation based on the Fourier transform of the plurality of coupled signal frames as described above. FIG. 17(a) shows signal spectra obtained where each one of signal frames is subjected to the Fourier transform as in the conventional technology. In FIG. 17 the horizontal axis represents frequencies and solid graduations indicate the frequencies of the carriers 42 in the modulation device 4C. FIG. 17(a) shows ideal signal spectra where frequencies of carriers 104 to identify the signal spectra (center frequencies of the signal spectra in FIG. 17) are matched with the respective frequencies of the carriers 42.

FIG. 17(b) shows signal spectra resulting from the Fourier transform of four coupled signal frame copies. In FIG. 17 thin graduations on the horizontal axis indicate frequencies of carriers 104 to identify signal spectra. FIG. 17(b), similar to FIG. 17(a), shows ideal signal spectra where the frequencies of carriers 104 to identify the signal spectra are matched with the frequencies of the carriers 42. When a comparison is made between FIGS. 17(a) and (b), the frequency resolution in FIG. 17(b) is four times the frequency resolution in FIG. 17(a). Namely, the Fourier transform of n coupled signal frame copies can achieve n times the frequency resolution in the case of the Fourier transform of one signal frame. Namely, the frequency resolution can be enhanced by coupling a plurality of signal frame copies to increase the object time of the Fourier transform.

Incidentally, if there is a small deviation between the transmitter-side sampling frequency and the receiver-side sampling frequency, or if there is a deviation of the frequencies of carriers 42 due to the Doppler effect, the Fourier transform results in shifting the frequencies of the carriers 104 to identify the signal spectra, from the frequencies of the carriers 42. In this case, if the frequency resolution is low as shown in FIG. 17(a), the frequencies of carriers 104 to identify the deviated signal spectra will interfere with the frequencies corresponding to the adjacent signal spectra, so as to fail to recognize each of the signal spectra.

FIG. 17(c) shows signal spectra resulting from the Fourier transform of four coupled signal frame copies, where the frequencies of carriers 104 to identify the signal spectra deviate from the frequencies of the carriers 42. In this case, since the frequency resolution is high, the orthogonal frequencies to identify the deviated signal spectra do not interfere with the orthogonal frequencies corresponding to the adjacent signals. Therefore, each of the signal spectra can be identified.

As described above, the frequency resolution can be enhanced by the Fourier transform of a plurality of coupled signal frame copies. Since the frequency resolution is high, each of the signal spectra can be identified even if there are deviations of the frequencies of carriers 104 to identify the signal spectra.

Referring back to FIG. 15, the sub-carrier selection unit 111 detects the deviations of the frequencies of carriers 104 of the decoded signal spectra (transmission signal) and corrects the frequencies of carriers 104 of the signal spectra on the basis of the deviations of the frequencies of carriers 104 thus detected. Namely, when detecting the deviations of the frequencies of carriers 104 of the signal spectra, the sub-carrier selection unit 111 corrects the frequencies to the frequencies of carriers 42 closest to the frequencies of carriers 104. Since the deviations of the frequencies of carriers 104 of the signal spectra differ according to the frequencies, it is preferable to correct the deviation for each signal spectrum.

It is also preferable to configure the sub-carrier selection unit 111 so that a rate of deviation is estimated from deviations of frequencies of some carriers 104 and the correction is made based thereon. This method is effective because the deviations of frequencies of carriers 104 often increase or decrease at a constant rate from the frequencies of carriers 42. This method enables correction for a larger frequency shift or Doppler shift.

The demodulation device 10C configured as described above operates as follows. When the analog reception acoustic signal 9C is received, the A/D conversion unit 101 converts the reception acoustic signal 9C into a digital signal. The band-pass filter 106 divides the converted digital signal into the frame synchronization signal 107 and the OFDM modulation signal 108. The frame synchronization unit 102 divides the OFDM modulation signal 108 into frame units on the basis of the frame synchronization signal 107. The masker sound & guard time removal unit 103 removes the masker signal and the guard time signal from each frame in the divided digital signal to extract the signal frame.

The OFDM frame coupling unit 110 makes copies of each extracted signal frame and couples them. The demodulation unit 116 demodulates the plurality of coupled signal frames. The sub-carrier selection unit 111 corrects the frequencies of carriers 104 of signal spectra in the demodulated signals.

The phase compensation unit 109 extracts the pilot signal from the demodulated signal frame and compensates the phases of the other carriers 104 from a change in the pilot signal. After the compensation for the carriers 104, the P/S conversion unit 105 extracts the parallel transmission bits from the spectral coefficients of the carriers 104. The P/S conversion unit 105 converts the extracted parallel transmission bits into a single bit stream to generate the received transmission signal 11.

The following will describe the operation and effect of the modulation device 4C, the demodulation device 10C, and the demodulation method according to the third embodiment.

In the above-described modulation device 4C, the modulation unit 53 matches the amplitudes of the carriers 104 with the spectrum envelope of the acoustic signal 13 and modulates the carriers 104 by the encoded transmission signal 3 to generate the signal frame; therefore, the audible sound wave is generated as a sound wave to play a sound based on the acoustic signal and the signal included in the baseband signal can be changed into a state in which it can be transmitted at a higher bit rate by the audible sound wave. The masker sound generation unit 44 generates the masker signal outputted as a masker sound for making the sound harder to hear during the transmission of the signal frame, and attaches it to the signal frame, and the acoustic signal generation unit 54 replaces the components in the frequency band of carriers 104 in the acoustic signal 13 with the modulation signal (signal frame) to generate the synthetic acoustic signal; therefore, the audible sound wave including information can be transmitted in a state in which it is harder to hear because of the masker sound of the masker signal. Namely, the information can be transmitted by the audible sound wave based on the level inoffensive to the human auditory sense and the bit rate of transmitted information can be increased.

Since the foregoing demodulation device 10C and demodulation method are arranged to perform the Fourier transform of a plurality of coupled signal frame copies made by the OFDM frame coupling unit 110, it is feasible to narrow the width of frequencies of carriers 104 being orthogonal frequencies used in demodulation. Namely, the frequency resolution can be improved. The improvement in the frequency resolution permits the sub-carrier selection unit 111 to appropriately detect the deviations of the frequencies of carriers 104 of the transmission signal in the Fourier-transformed signal frame, and to correct the frequencies of carriers 104.

Industrial Applicability

The present invention has uses in the sound wave information communication technology to transmit information by a sound wave, and enables transmission of information by the audible sound wave based on the level inoffensive to the human auditory sense and improvement in the bit rate of transmitted information.

The invention claimed is:

1. A modulation device comprising:

spectrum amplitude adjustment means for receiving an input of an acoustic signal, which includes a sound of a voice or music, and for outputting a spectrum envelope of the acoustic signal;

modulation means for receiving a baseband signal that includes encoded transmission data and the spectrum envelope of the acoustic signal from the spectrum amplitude adjustment means, for matching an amplitude of a carrier in an audible sound region with the spectrum envelope of the acoustic signal and for modulating the carrier by the baseband signal to generate a modulated signal; and acoustic signal generation means for replacing a component in a frequency band of the carrier in the acoustic signal with the modulated signal generated by the modulation means, to generate a synthetic acoustic signal that includes the sound of the voice or music and the encoded transmission data, by filtering the frequency band corresponding to the modulated signal in the acoustic signal to output the acoustic signal with the frequency band removed and then superposing the modulated signal onto the acoustic signal in which the frequency band was removed.

2. The modulation device according to claim 1, wherein when there is a frequency less than a predetermined threshold based on an audible level in the spectrum envelope of the acoustic signal, the modulation means amplifies a power of a spectrum at the frequency to the threshold.

3. The modulation device according to claim 1, wherein the modulation means performs the modulation using OFDM modulation method.

4. A modulation method comprising:

a spectrum amplitude adjustment step of receiving, by spectrum amplitude adjustment means, an input of an acoustic signal, which includes a sound of a voice or music, and outputting a spectrum envelope of the acoustic signal;

a modulation step of receiving, by a modulation means, a baseband signal that includes encoded transmission data and the spectrum envelope of the acoustic signal from the spectrum amplitude adjustment means, matching an amplitude of a carrier in an audible sound region with the spectrum envelope of the acoustic signal and modulating the carrier by the baseband signal to generate a modulated signal; and an acoustic signal generation step of replacing, by acoustic signal generation means, a component in a frequency band of the carrier in the acoustic signal with the modulated signal generated in the modulation step, to generate a synthetic acoustic signal that includes the sound of the voice or music and the encoded transmission data, by filtering the frequency band corresponding to the modulated signal in the acoustic signal to output the acoustic signal with the frequency band removed and then superposing the modulated signal onto the acoustic signal in which the frequency band was removed.

5. The modulation method according to claim 4, wherein the modulation means performs the modulation using OFDM modulation method.

* * * * *